US012451600B2

(12) United States Patent
Izawa

(10) Patent No.: US 12,451,600 B2
(45) Date of Patent: Oct. 21, 2025

(54) ANTENNA DEVICE

(71) Applicant: Murata Manufacturing Co., Ltd., Kyoto (JP)

(72) Inventor: Masahiro Izawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 159 days.

(21) Appl. No.: 18/426,896

(22) Filed: Jan. 30, 2024

(65) Prior Publication Data

US 2024/0170838 A1 May 23, 2024

Related U.S. Application Data

(63) Continuation of application No. PCT/JP2022/030047, filed on Aug. 5, 2022.

(30) Foreign Application Priority Data

Aug. 18, 2021 (JP) ................................ 2021-133550

(51) Int. Cl.
*H01Q 1/48* (2006.01)
*H01Q 9/04* (2006.01)

(52) U.S. Cl.
CPC ............ *H01Q 1/48* (2013.01); *H01Q 9/0407* (2013.01)

(58) Field of Classification Search
CPC ...... H01Q 9/0407; H01Q 1/241; H01Q 1/521; H01Q 1/48
See application file for complete search history.

(56) References Cited

U.S. PATENT DOCUMENTS

2008/0094302 A1* 4/2008 Murch .................... H01Q 1/48 343/846
2010/0238079 A1* 9/2010 Ayatollahi ............ H01Q 1/521 343/729
2012/0139793 A1 6/2012 Sharawi
(Continued)

FOREIGN PATENT DOCUMENTS

CN 113594685 A * 11/2021 .............. H01Q 1/38
JP 2005-072653 A 3/2005
(Continued)

OTHER PUBLICATIONS

International Search Report for PCT/JP2022/030047 dated Oct. 25, 2022.

*Primary Examiner* — Dameon E Levi
*Assistant Examiner* — David Andrew Kubera
(74) *Attorney, Agent, or Firm* — McDonald Hopkins LLC

(57) ABSTRACT

An antenna device includes a ground electrode on rear sides of first and second antenna elements. The ground electrode includes ground layers and respectively having slits located between the first and second antenna elements as viewed in the thickness direction of the ground electrode. A first edge on a side of the first antenna element of the slit includes a first portion and a second portion closer to a second edge on a side of the second antenna element than the first portion. A fourth edge on the side of the second antenna element of the slit includes a third portion closer to the second antenna element than the first portion and includes a fourth portion closer to a third edge on the side of the first antenna element than the third portion and closer to the first antenna element than the second portion.

20 Claims, 23 Drawing Sheets

(56) References Cited

U.S. PATENT DOCUMENTS

| | | | | |
|---|---|---|---|---|
| 2019/0006764 | A1 | 1/2019 | Yen et al. | |
| 2019/0245275 | A1 | 8/2019 | Hayashi et al. | |
| 2021/0367326 | A1 * | 11/2021 | Chen | H01Q 1/38 |
| 2022/0123461 | A1 * | 4/2022 | Wu | H01Q 9/0421 |
| 2023/0223690 | A1 * | 7/2023 | Tanbo | H01Q 1/24<br>343/746 |
| 2025/0070449 | A1 * | 2/2025 | Suh | H01Q 21/08 |

FOREIGN PATENT DOCUMENTS

| | | | | |
|---|---|---|---|---|
| JP | 2008-098919 | A | 4/2008 | |
| JP | 2013-168894 | A | 8/2013 | |
| JP | 2017-201754 | A | 11/2017 | |
| KR | 10-2009-0093120 | A | 9/2009 | |
| WO | 2018/021316 | A1 | 2/2018 | |
| WO | WO-2023022017 | A1 * | 2/2023 | H01Q 1/48 |

* cited by examiner

ANTENNA DEVICE

CROSS REFERENCE TO RELATED APPLICATION

This is a continuation of International Application No. PCT/JP2022/030047 filed on Aug. 5, 2022 which claims priority from Japanese Patent Application No. 2021-133550 filed on Aug. 18, 2021. The contents of these applications are incorporated herein by reference in their entireties.

BACKGROUND OF THE DISCLOSURE

Field of the Disclosure

The present disclosure relates to an antenna device.

Description of the Related Art

Patent Document 1 discloses a system including a ground plane filter for the isolation of elements. The system disclosed in Patent Document 1 includes a ground plane, a plurality of antenna elements, and a filter. The filter includes eight slots formed in a portion of the ground plane between the antenna elements. The eight slots are orthogonal to a straight line path between the antenna elements.

Patent Document 1: U.S. Patent Application Publication No. 2008/94302

BRIEF SUMMARY OF THE DISCLOSURE

Patent Document 1 provides a technology to improve the isolation between antennas by forming slots (slits) in a portion of the ground plane between the antennas. However, although Patent Document 1 improves the isolation between the antennas, there is a possibility that radio waves from the antennas can pass through the slits in the ground plane and leak toward the rear sides (back sides) of the antenna elements. In other words, through the slits, radiation toward the rear sides of the antenna elements can be stronger. This can be a factor that degrades the directivity in the front direction.

The present disclosure provides an antenna device in which the leakage of radio waves toward the rear sides of antenna elements can be lower while the isolation between the antenna elements is improved.

An antenna device according to a configuration of the present disclosure includes: a first antenna element; a second antenna element; and a ground electrode located on rear sides of the first antenna element and the second antenna element and coupled to the first antenna element and the second antenna element. The ground electrode includes first and second ground layers aligned in a thickness direction of the ground electrode. The first ground layer has a first slit located between the first antenna element and the second antenna element as viewed in the thickness direction of the ground electrode, extending from an edge of the first ground layer corresponding to a specified edge of the ground electrode in a second direction intersecting a first direction parallel to a line connecting the first antenna element and the second antenna element, and including a first edge on a side of the first antenna element and a second edge on a side of the second antenna element. The second ground layer has a second slit extending from an edge of the second ground layer corresponding to the specified edge of the ground electrode in the second direction, aligned with the first slit in the thickness direction of the ground electrode, and including a third edge on the side of the first antenna element and a fourth edge on the side of the second antenna element. The first edge of the first slit includes a first portion and a second portion closer to the second edge than the first portion. The fourth edge of the second slit includes a third portion located side by side with the first portion in the first direction and closer to the second antenna element than the first portion and a fourth portion located side by side with the second portion in the first direction, closer to the third edge than the third portion, and closer to the first antenna element than the second portion.

A configuration of the present disclosure enables a reduction in the leakage of radio waves toward the rear sides of antenna elements while improving the isolation between the antenna elements.

DETAILED DESCRIPTION OF THE DISCLOSURE

1. Embodiments

Figure 1:
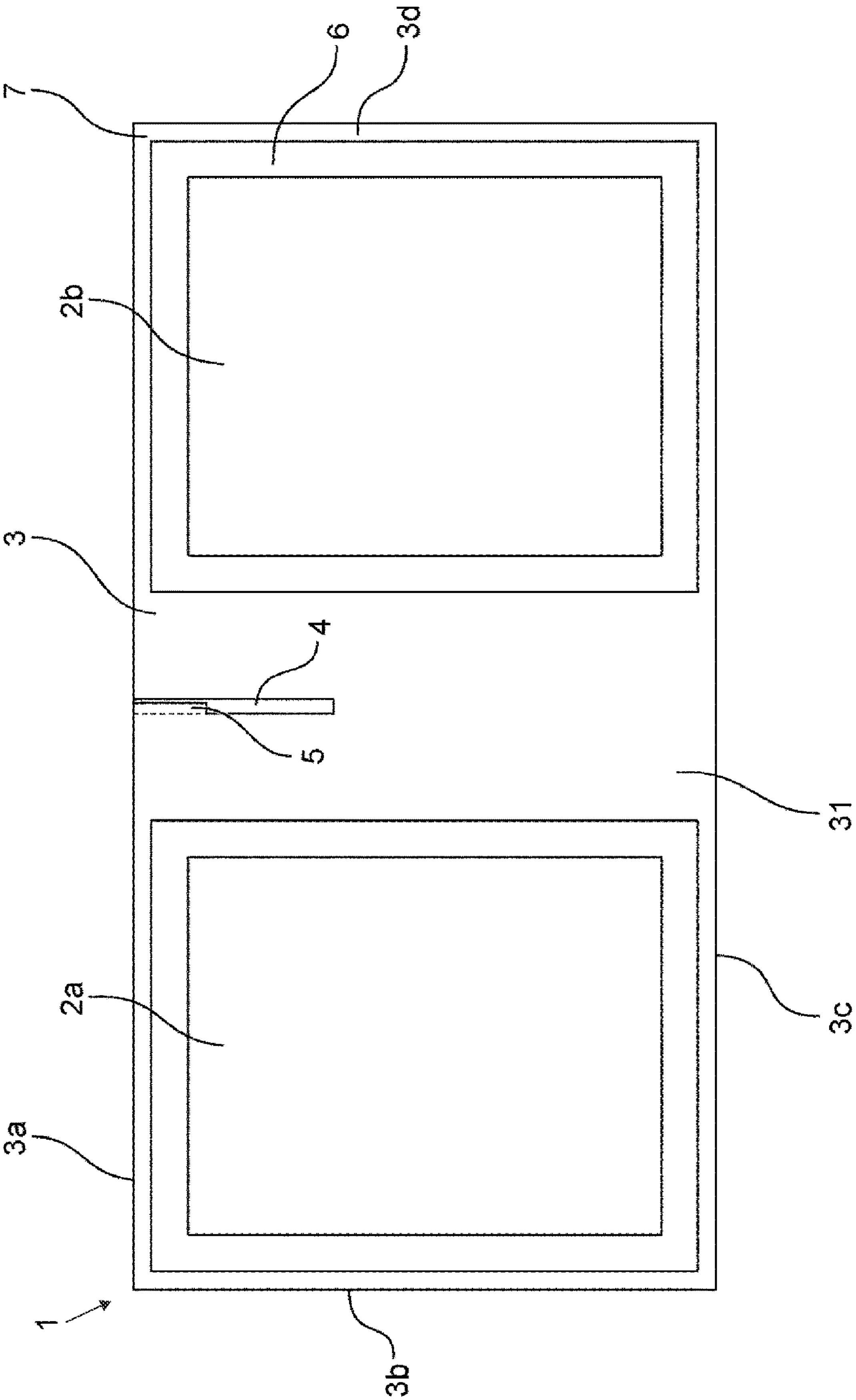
FIG. 1 is a plan view of a configuration example of an antenna device according to Embodiment 1.

Hereinafter, embodiments of the present disclosure will be described with reference to the drawings when necessary. However, the following embodiments are examples for explaining the present disclosure and are hence not intended to limit the present disclosure to the following configurations. Unless otherwise specified, the positional relationships such as "upper and lower" and "right and left" are based on the illustrations in the drawings. Figures used for explaining the following embodiments are schematic, and hence the ratios of the sizes and thicknesses of the components in each figure do not necessarily reflect the ratios of actual dimensions. The ratios of dimensions of each element are not limited to the ratios illustrated in the drawings.

Note that in the following description, in the case in which a plurality of components need to be distinguished from one another, prefixes such as "first" and "second" are added to the names of components. However, in the case in which components can be distinguished from one another by the symbols added to the components, prefixes such as "first" and "second" may be omitted in some cases to make the sentences easier to read.

1.1 Embodiment 1

1.1.1 Configuration

Figure 2:
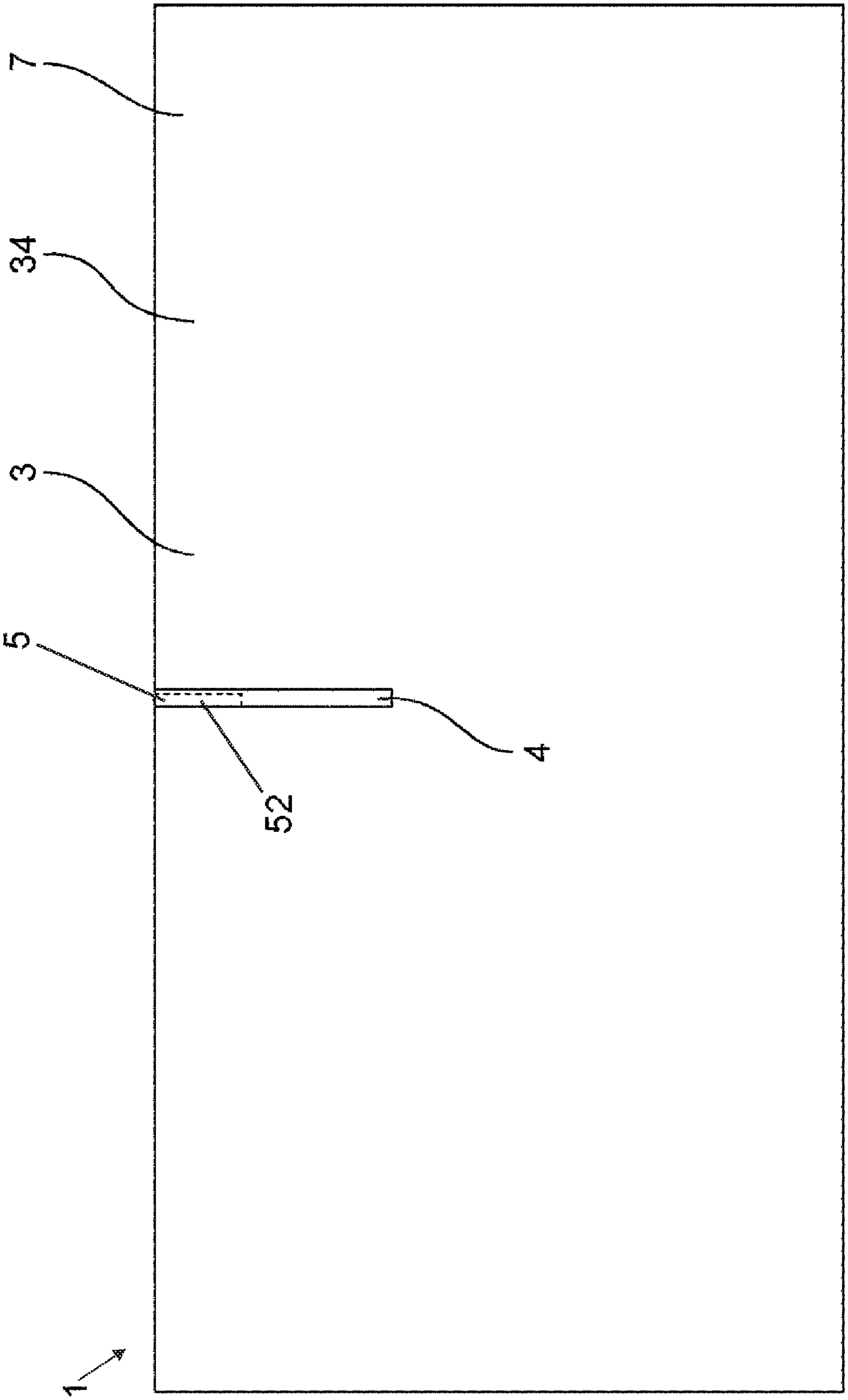
FIG. 2 is a bottom view of the antenna device in FIG. 1.
Figure 3:
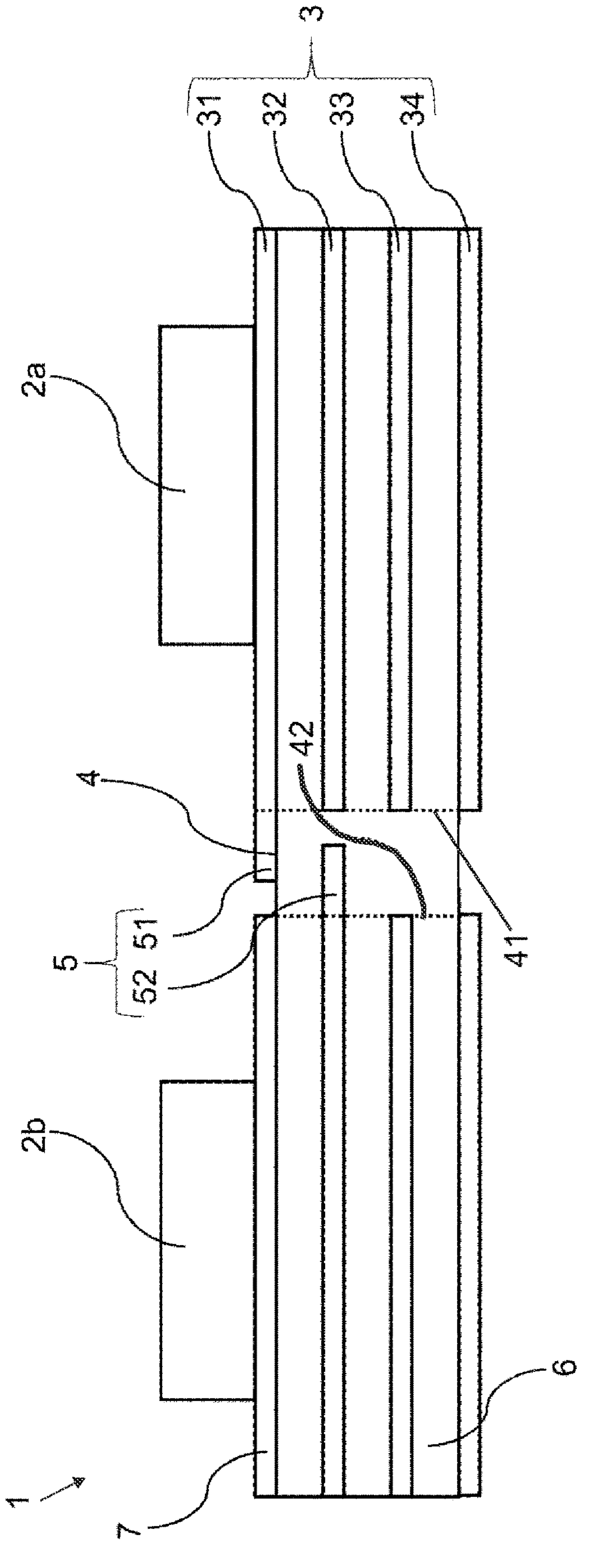
FIG. 3 is a schematic side view of the antenna device in FIG. 1.

FIG. 1 is a plan view of a configuration example of an antenna device 1 according to Embodiment 1. FIG. 2 is a bottom view of the antenna device 1. FIG. 3 is a schematic side view of the antenna device 1. In FIG. 3, to make the configuration of the antenna device 1 easier to understand, the ratios of dimensions of the components in the antenna device 1 differ from the ones in FIGS. 1 and 2.

The antenna device 1 is configured to be mounted on equipment for communication in specified frequency bandwidths. The antenna device 1 in FIG. 1 includes a first antenna element 2*a*, a second antenna element 2*b*, and a substrate 7 on which the first antenna element 2*a* and the second antenna element 2*b* are mounted.

As illustrated in FIG. 1, each of the first antenna element 2*a* and the second antenna element 2*b* is a planar antenna (for example, a patch antenna). Each of the first antenna element 2*a* and the second antenna element 2*b* supports a first frequency bandwidth and a second frequency bandwidth higher than the first frequency bandwidth. The first frequency bandwidth and the second frequency bandwidth are, for example, frequency bandwidths used for radio communication in UWB. As an example, the center frequency of the first frequency bandwidth is 6.5 GHZ, and the center frequency of the second frequency bandwidth is 8.0 GHZ. Each of the first antenna element 2*a* and the second antenna element 2*b* can be a conventional publicly-known planar antenna, and hence, detailed description is omitted.

As illustrated in FIGS. 1 and 2, the substrate 7 has a rectangular plate shape. The first antenna element 2*a* and the second antenna element 2*b* are located on one surface of the substrate 7 and aligned in the longitudinal direction of the substrate 7.

As illustrated in FIG. 3, the substrate 7 includes a ground electrode 3 and dielectric layers 6. The substrate 7 has a configuration utilizing a multilayer substrate. Examples of multilayer substrates include a low-temperature co-fired ceramic (LTCC) multilayer substrate, a multilayer resin substrate including a plurality of laminated resin layers composed of a resin such as epoxy or polyimide, a multilayer resin substrate including a plurality of laminated resin layers composed of a liquid crystal polymer (LCP) having lower permittivity, a multilayer resin substrate including a plurality of laminated resin layers composed of a fluorine-based resin, and a ceramic multilayer substrate other than LTCC.

The ground electrode 3 serves as grounding for the first antenna element 2*a* and the second antenna element 2*b*. As illustrated in FIG. 3, the ground electrode 3 is located on the rear sides of the first antenna element 2*a* and the second antenna element 2*b*. The ground electrode 3 is coupled to the first antenna element 2*a* and the second antenna element 2*b*. As illustrated in FIGS. 1 and 2, the ground electrode 3 is rectangular. The ground electrode 3 has the longitudinal direction (the right-left direction in FIGS. 1 and 2), the width direction (the up-down direction in FIGS. 1 and 2), and the thickness direction (the up-down direction in FIG. 3). The ground electrode 3 includes a first edge 3*a*, a second edge 3*b*, a third edge 3*c*, and a fourth edge 3*d*. The first edge 3*a* and the third edge 3*c* are opposed to each other and extend in the longitudinal direction of the ground electrode 3. The second edge 3*b* and the fourth edge 3*d* are opposed to each other and extend in the width direction of the ground electrode 3. The ground electrode 3 has a size that covers all the areas of the first antenna element 2*a* and the second antenna element 2*b*.

As illustrated in FIG. 3, the ground electrode 3 has a multilayer structure. The following describes further details of the ground electrode 3 with reference to FIG. 3 and FIGS. 5 to 7.

Figure 4:
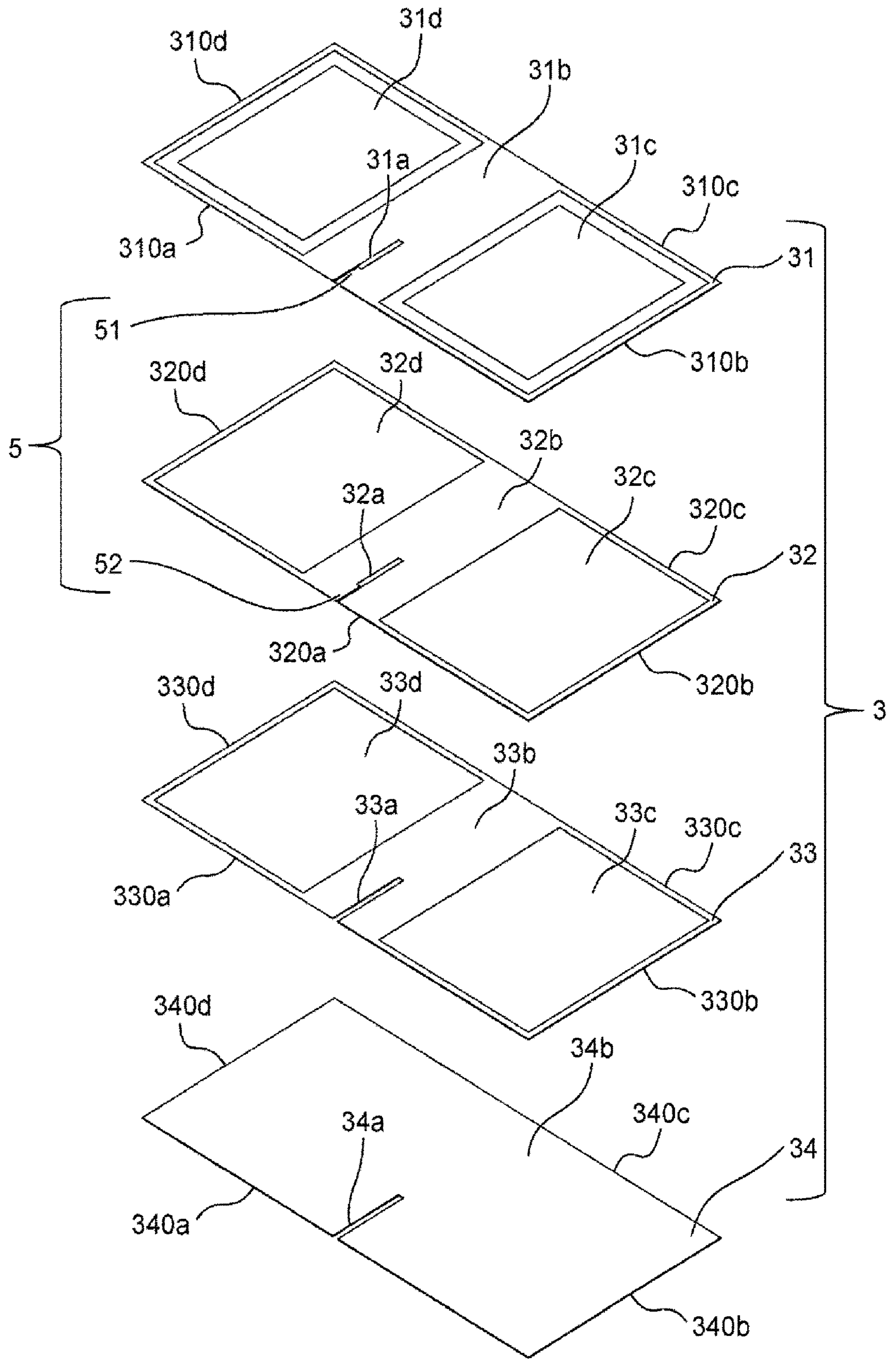
FIG. 4 is an exploded perspective view of a ground electrode of the antenna device in FIG. 1.

FIG. 4 is an exploded perspective view of the ground electrode 3. As illustrated in FIG. 4, the ground electrode 3 includes a plurality of ground layers 31 to 34. As illustrated in FIG. 3, the plurality of ground layers 31 to 34 are aligned in the thickness direction of the ground electrode 3. The distances between the plurality of ground layers 31 to 34 are defined by the dielectric layers 6.

The ground layer 31 is the closest to the first antenna element 2*a* and the second antenna element 2*b* among the plurality of ground layers 31 to 34. The ground layer 31 is the uppermost layer of the substrate 7. The ground layer 31 defines the front face of the substrate 7. The ground layer 31 is rectangular. The ground layer 31 has first to fourth edges 310*a* to 310*d* respectively corresponding to the first to fourth edges 3*a* to 3*d* of the ground electrode 3. The ground layer 31 has a slit 31*a*. The slit 31*a* is located at a center portion 31*b* in the longitudinal direction of the ground layer 31. The ground layer 31 has a first opening 31*c* and a second opening 31*d* at both end portions in the longitudinal direction of the ground layer 31. The first opening 31*c* is larger than the first antenna element 2*a*. The second opening 31*d* is larger than the second antenna element 2*b*.

Following the ground layer 31, the ground layer 32 is the next closest layer to the first antenna element 2*a* and the second antenna element 2*b* among the plurality of ground layers 31 to 34. The ground layer 32 is an intermediate layer (the second layer) of the substrate 7. The ground layer 32 has a rectangular shape similar to that of the ground layer 31. The ground layer 32 has first to fourth edges 320*a* to 320*d* respectively corresponding to the first to fourth edges 3*a* to 3*d* of the ground electrode 3. The ground layer 32 has a slit 32*a*. The slit 32*a* is located at a center portion 32*b* in the longitudinal direction of the ground layer 32. The ground layer 32 has a first opening 32*c* and a second opening 32*d* at both end portions in the longitudinal direction of the ground layer 32. The first opening 32*c* is larger than the first antenna element 2*a*. The second opening 32*d* is larger than the second antenna element 2*b*. In the present embodiment, the first opening 32*c* in the ground layer 32 has the same size as that of the first opening 31*c* in the ground layer 31. In the present embodiment, the second opening 32*d* in the ground layer 32 has the same size as that of the second opening 31*d* in the ground layer 31.

Following the ground layer 32, the ground layer 33 is the next closest layer to the first antenna element 2*a* and the second antenna element 2*b* among the plurality of ground layers 31 to 34. The ground layer 33 is an intermediate layer (the third layer) of the substrate 7. The ground layer 33 has a rectangular shape similar to those of the ground layers 31 and 32. The ground layer 33 has first to fourth edges 330*a* to 330*d* respectively corresponding to the first to fourth edges 3*a* to 3*d* of the ground electrode 3. The ground layer 33 has a slit 33*a*. The slit 33*a* is located at a center portion 33*b* in the longitudinal direction of the ground layer 33. The ground layer 33 has a first opening 33*c* and a second opening 33*d* at both end portions in the longitudinal direction of the ground layer 33. The first opening 33*c* is larger than the first antenna element 2*a*. The second opening 33*d* is larger than the second antenna element 2*b*. In the present embodiment, the first opening 33*c* in the ground layer 33 has the same size as that of the first opening 31*c* in the ground layer 31. In the present embodiment, the second opening 33*d* in the ground layer 33 has the same size as that of the second opening 31*d* in the ground layer 31.

The ground layer 34 is the farthest layer from the first antenna element 2*a* and the second antenna element 2*b* among the plurality of ground layers 31 to 34. The ground layer 34 is the lowermost layer of the substrate 7. The ground layer 34 defines the rear face of the substrate 7. The ground layer 34 has a rectangular shape similar to those of the ground layers 31 and 33. The ground layer 34 has first to fourth edges 340*a* to 340*d* respectively corresponding to the first to fourth edges 3*a* to 3*d* of the ground electrode 3. The ground layer 34 has a slit 34*a*. The slit 34*a* is located at a center portion 34*b* in the longitudinal direction of the ground layer 34. The ground layer 34 does not have openings at both end portions in the longitudinal direction of the ground layer 34. Both end portions of the ground layer 34 in the longitudinal direction face the rear faces of the first antenna element 2*a* and the second antenna element 2*b*.

The plurality of ground layers 31 to 34 are coupled to the first antenna element 2*a* and the second antenna element 2*b*. In the present embodiment, the ground layers 31 to 34 are electrically coupled to one another with interlayer wiring formed in the dielectric layers 6. The first antenna element 2*a* is located in the first openings 31*c* to 33*c* in the ground layers 31 to 33 and electrically coupled to the ground layer 34 with interlayer wiring formed in the dielectric layers 6. The second antenna element 2*b* is located in the second openings 31*d* to 33*d* in the ground layers 31 to 33 and electrically coupled to the ground layer 34 with interlayer wiring formed in the dielectric layers 6. This configuration enables the ground electrode 3 to function as grounding for the first antenna element 2*a* and the second antenna element 2*b*.

In addition, the ground layers 31 to 34 have the respective slits 31*a* to 34*a*, as described above. The following further describes the slits 31*a* to 34*a* of the ground layers 31 to 34 with reference to FIGS. 5 to 9. Note that in FIGS. 5 to 9, illustration of the dielectric layers 6 is omitted to make the drawings easier to view.

Figure 5B:
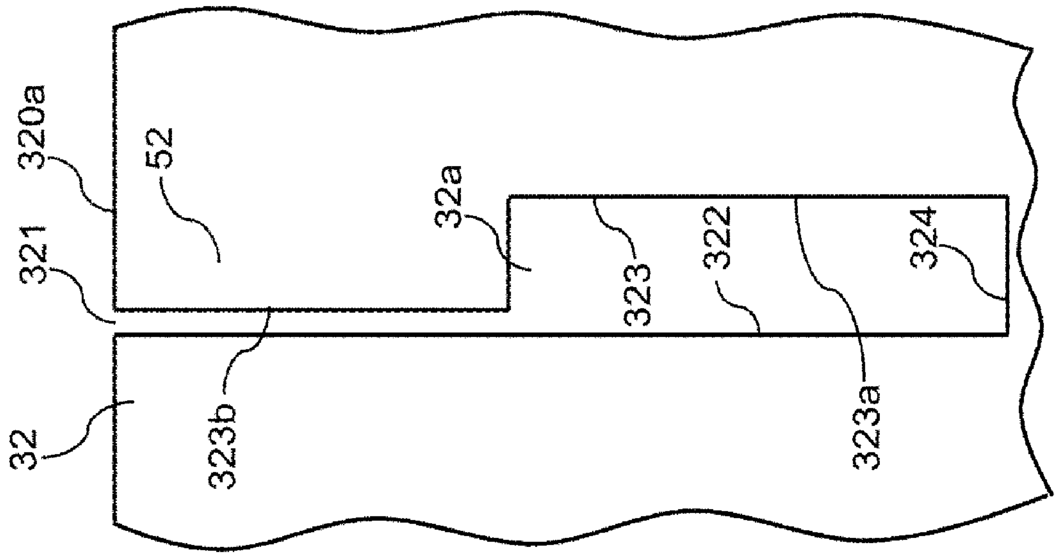
FIG. 5B is a plan view of part of a configuration example of a ground layer serving as the second layer of the ground electrode.
Figure 5A:
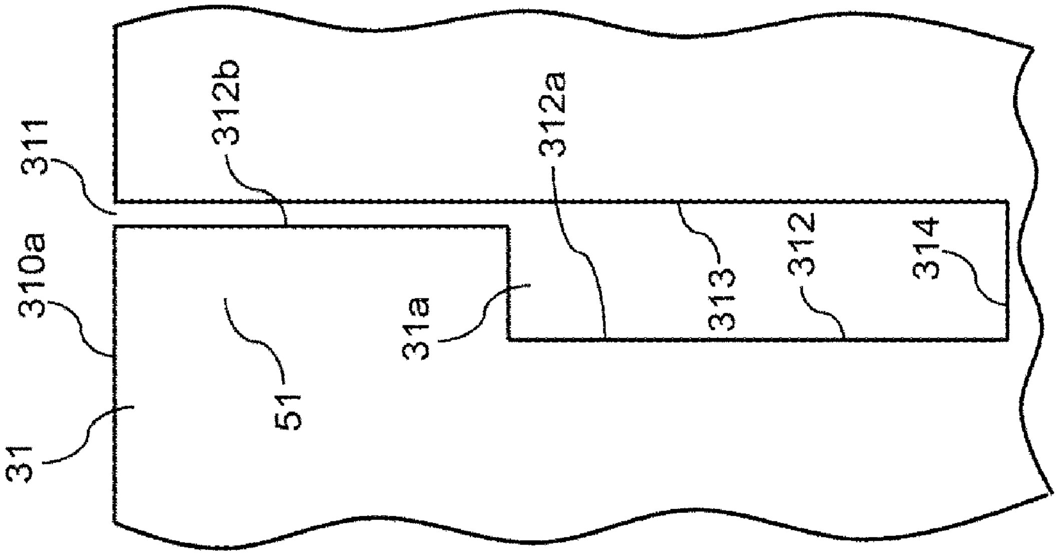
FIG. 5A is a plan view of part of a configuration example of a ground layer serving as the uppermost layer of the ground electrode.

FIG. 5A is a plan view of part of a configuration example of the ground layer 31, illustrating the slit 31*a* and its vicinities of the ground layer 31. The slit 31*a* is located between the first antenna element 2*a* and the second antenna element 2*b* as viewed in the thickness direction of the ground electrode 3. As illustrated in FIG. 5A, the slit 31*a* extends from the first edge 310*a* of the ground layer 31 in a second direction (the up-down direction in FIG. 5A) intersecting a first direction (the right-left direction in FIG. 5A) parallel to a line connecting the first antenna element 2*a* and the second antenna element 2*b*. The first edge 310*a* is the edge of the ground layer 31 corresponding to a specified edge (the first edge 3*a* in the present embodiment) of the ground electrode 3. A line connecting the first antenna element 2*a* and the second antenna element 2*b* is, for example, the line connecting the center of the first antenna element 2*a* and the center of the second antenna element 2*b*. In the present embodiment, the first direction corresponds to the longitudinal direction of the ground electrode 3, and the second direction corresponds to the width direction of the ground electrode 3.

The slit 31*a* in FIG. 5A includes an open end 311, an edge 312 on the first antenna element 2*a* side (on the left side in FIG. 5A), an edge 313 on the second antenna element 2*b* side (on the right side in FIG. 5A), and a closed end 314. The slit 31*a* is linear. The width of the slit 31*a* is not uniform, and the slit 31*a* has a small width portion and a large width portion. More specifically, in the slit 31*a*, the edge 313 on the second antenna element 2*b* side is linear, but the edge 312 on the first antenna element 2*a* side is not linear and has a shape in which the distance to the edge 313 on the second antenna element 2*b* side varies. The edge 312 includes first and second portions 312*a* and 312*b* the distances from which to the edge 313 differ. The second portion 312*b* is closer to the edge 313 than the first portion 312*a*. The second portion 312*b* corresponds to an end portion on the edge 313 side of a first protrusion 51 protruding from the first portion 312*a* toward the edge 313 in the ground layer 31. The first protrusion 51 is rectangular. The slit 31*a* is narrower at the second portion 312*b* than at the first portion 312*a*. The second portion 312*b* is closer to the open end 311 of the slit 31*a* than the first portion 312*a*. The second portion 312*b* is closer to the open end 311 of the slit 31*a* than the center of the slit 31*a*. In the present embodiment, the second portion 312*b* is located at the open end 311 of the slit 31*a*.

FIG. 5B is a plan view of part of a configuration example of the ground layer 32, illustrating the slit 32*a* and its vicinities of the ground layer 32. The slit 32*a* is located between the first antenna element 2*a* and the second antenna element 2*b* as viewed in the thickness direction of the ground electrode 3. As illustrated in FIG. 5B, the slit 32*a* extends from the first edge 320*a* of the ground layer 32 in the second direction (the up-down direction in FIG. 5B). The first edge 320*a* is the edge of the ground layer 32 corresponding to the specified edge (the first edge 3*a* in the present embodiment) of the ground electrode 3.

The slit 32*a* in FIG. 5B includes an open end 321, an edge 322 on the first antenna element 2*a* side (on the left side in FIG. 5B), an edge 323 on the second antenna element 2*b* side (on the right side in FIG. 5B), and a closed end 324. The slit 32*a* is linear. The width of the slit 32*a* is not uniform, and the slit 32*a* has a small width portion and a large width portion. More specifically, in the slit 32*a*, the edge 322 on the first antenna element 2*a* side is linear, but the edge 323 on the second antenna element 2*b* side is not linear and has a shape in which the distance to the edge 322 varies. The edge 323 includes third and fourth portions 323*a* and 323*b* the distances from which to the edge 322 differ. The fourth portion 323*b* is closer to the edge 322 than the third portion 323*a*. The fourth portion 323*b* corresponds to an end portion on the edge 322 side of a second protrusion 52 protruding from the third portion 323*a* toward the edge 322 in the ground layer 32. The second protrusion 52 is rectangular. The fourth portion 323*b* is closer to the open end 321 of the slit 32*a* than the third portion 323*a*. The fourth portion 323*b* is closer to the open end 321 of the slit 32*a* than the center of the slit 32*a*. In the present embodiment, the fourth portion 323*b* is located at the open end 321 of the slit 32*a*.

Figure 6A:
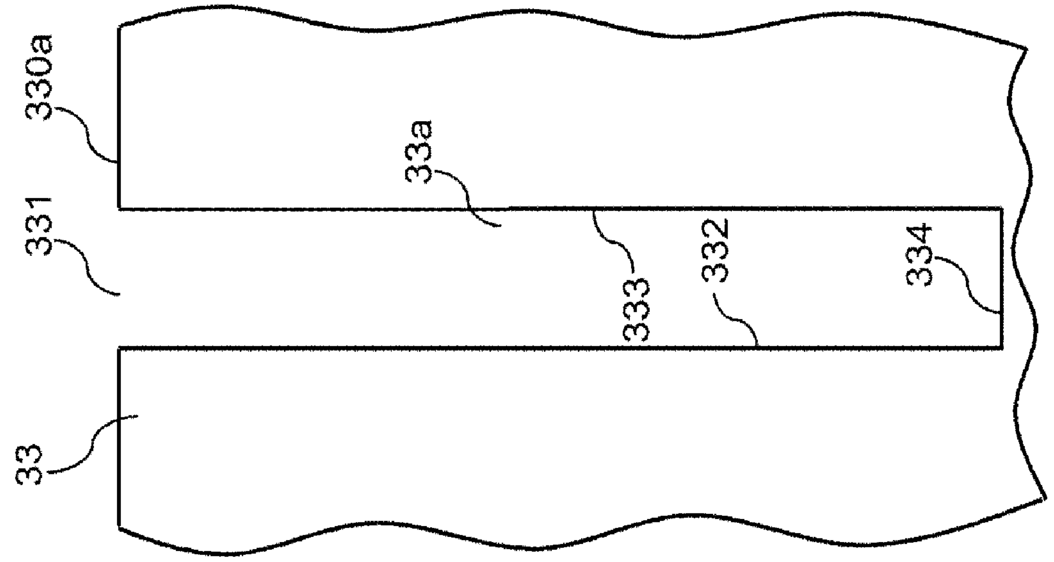
FIG. 6A is a plan view of part of a configuration example a ground layer serving as the third layer of the ground electrode.

FIG. 6A is a plan view of part of a configuration example of the ground layer 33, illustrating the slit 33*a* and its vicinities of the ground layer 33. The slit 33*a* is located between the first antenna element 2*a* and the second antenna element 2*b* as viewed in the thickness direction of the ground electrode 3. As illustrated in FIG. 6A, the slit 33*a* extends from the first edge 330*a* of the ground layer 33 in the second direction (the up-down direction in FIG. 6A). The first edge 330*a* is the edge of the ground layer 33 corresponding to the specified edge (the first edge 3*a* in the present embodiment) of the ground electrode 3. The slit 33*a* in FIG. 6A includes an open end 331, an edge 332 on the first antenna element 2*a* side (on the left side in FIG. 6A), and an edge 333 on the second antenna element 2*b* side (on the right side in FIG. 6A), and a closed end 334. The slit 33*a* is linear. The width of the slit 33*a* is uniform.

Figure 6B:
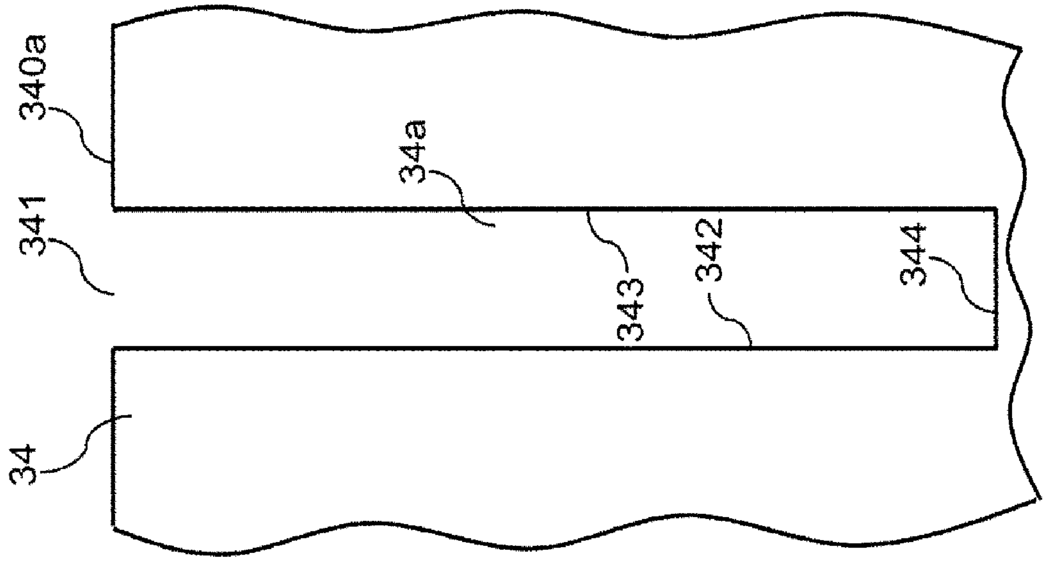
FIG. 6B is a plan view of part of a configuration example of a ground layer serving as the lowermost layer of the ground electrode.

FIG. 6B is a plan view of part of a configuration example of the ground layer 34, illustrating the slit 34*a* and its vicinities of the ground layer 34. The slit 34*a* is located between the first antenna element 2*a* and the second antenna element 2*b* as viewed in the thickness direction of the ground electrode 3. As illustrated in FIG. 6B, the slit 34*a* extends from the first edge 340*a* of the ground layer 34 in the second direction (the up-down direction in FIG. 6B). The first edge 340*a* is the edge of the ground layer 34 corresponding to the specified edge (the first edge 3*a* in the present embodiment) of the ground electrode 3. The slit 34*a* in FIG. 6B includes an open end 341, an edge 342 on the first antenna element 2*a* side (on the left side in FIG. 6B), an edge 343 on the second antenna element 2*b* side (on the right side in FIG. 6B), and a closed end 344. The slit 34*a* is linear. The width of the slit 34*a* is uniform.

Figures 7A, 7B:
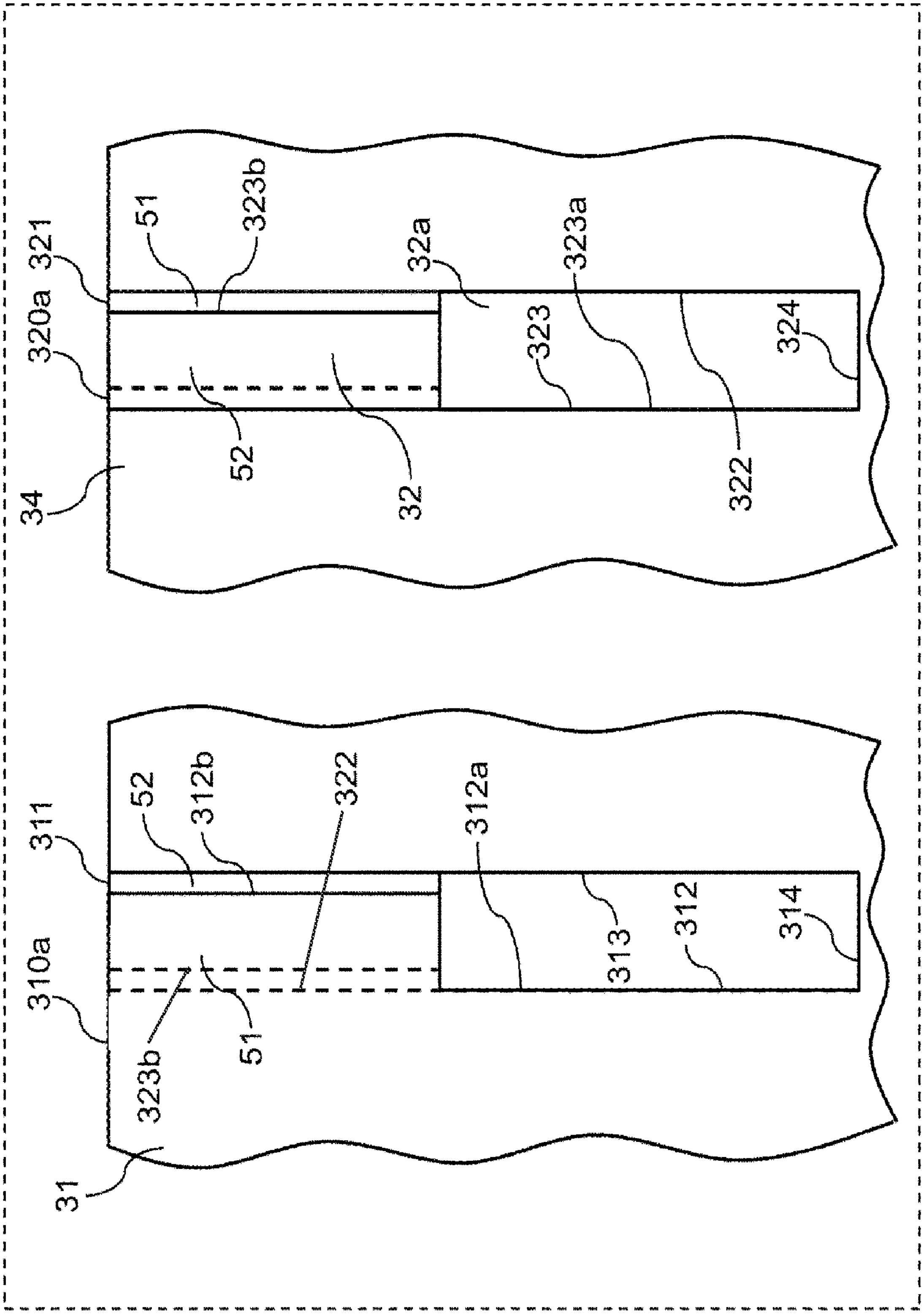
FIG. 7A is a plan view of part of the configuration example of the ground electrode in FIG. 4.
FIG. 7B is a bottom view of part of the configuration example of the ground electrode in FIG. 4.
Figure 8:
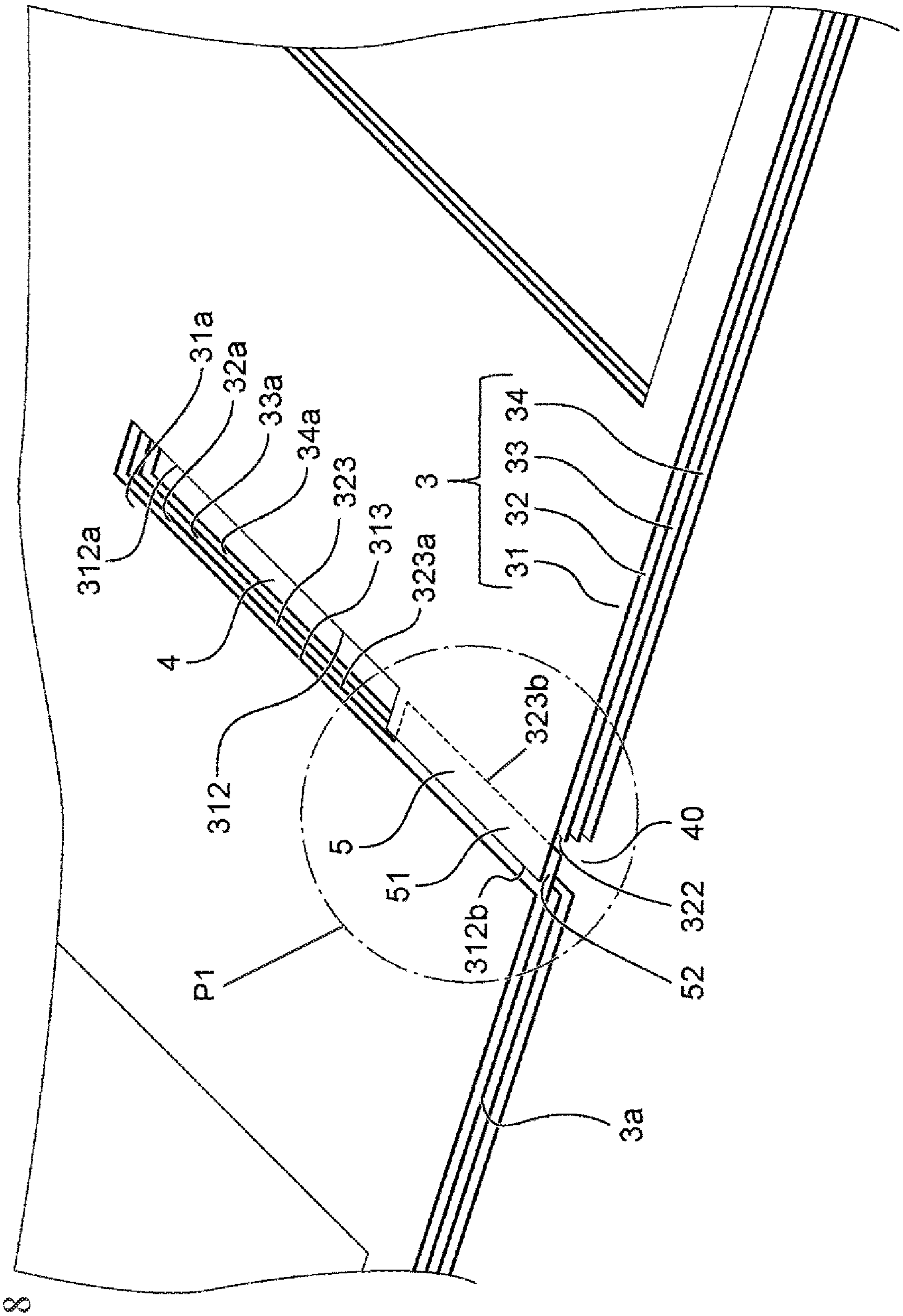
FIG. 8 is an enlarged perspective view of part of the ground electrode of the antenna device in FIG. 1.
Figure 9:
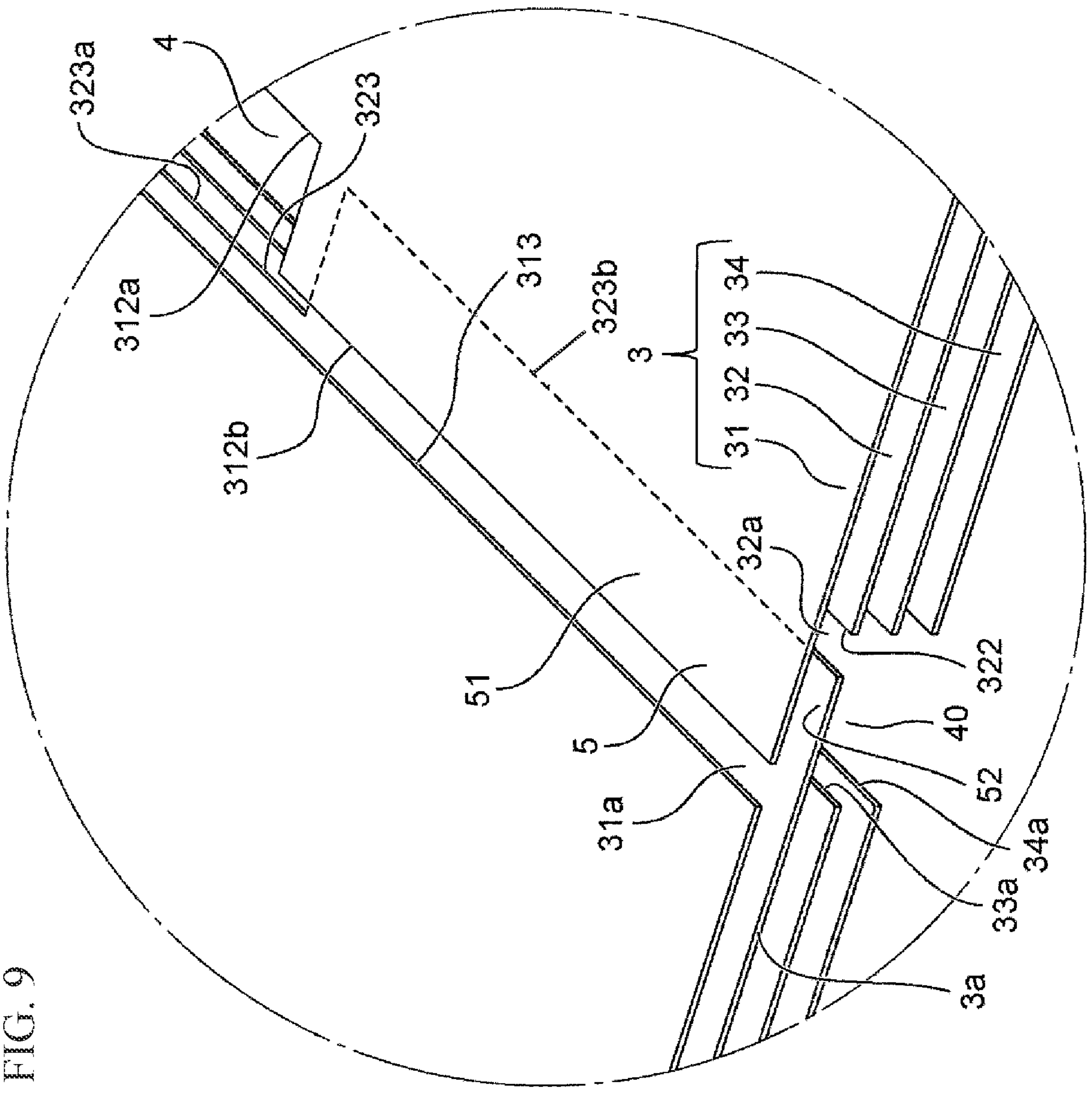
FIG. 9 is an enlarged view of the portion indicated by P1 in FIG. 8.

Next, a description will be given of the positional relationship between the slits 31*a* to 34*a* of the ground layers 31 to 34 with reference to FIGS. 7 to 9. FIG. 7A is a plan view of part of a configuration example of the ground electrode 3, illustrating the slits 31*a* to 34*a* and their vicinities. FIG. 7B is a bottom view of part of the configuration example of the ground electrode 3, illustrating the slits 31*a* to 34*a* and their vicinities. FIG. 8 is an enlarged perspective view of part of the ground electrode 3, illustrating the slits 31*a* to 34*a* and their vicinities. FIG. 9 is an enlarged view of the portion indicated by P1 in FIG. 8.

As illustrated in FIGS. 8 and 9, the slits 31*a* to 34*a* of the ground layers 31 to 34 are aligned in the thickness direction of the ground electrode 3.

The open ends 311 to 341 of the slits 31*a* to 34*a* overlap one another in the thickness direction of the ground electrode 3. The closed ends 314 to 344 of the slits 31*a* to 34*a* overlap one another in the thickness direction of the ground electrode 3. The slits 31*a* to 34*a* have the same length. The length of the slits 31*a* to 34*a* is, for example, the distance between the open ends 311 to 341 and the closed ends 314 to 344 of the slits 31*a* to 34*a*. In the present embodiment, each of the slits 31*a* to 34*a* has a length adapted to a wavelength of the first frequency bandwidth.

As illustrated in FIGS. 8 and 9, the first portion 312*a* of the slit 31*a* is located side by side with the third portion 323*a* in the first direction and closer to the first antenna element 2*a* than the third portion 323*a*. The second portion 312*b* is located side by side with the fourth portion 323*b* in the first direction, closer to the second edge 313 than the first portion 312*a*, and closer to the second antenna element 2*b* than the fourth portion 323*b*. The third portion 323*a* of the slit 32*a* is located side by side with the first portion 312*a* in the first direction and closer to the second antenna element 2*b* than the first portion 312*a*. The fourth portion 323*b* is located side by side with the second portion 312*b* in the first direction, closer to the third edge 322 than the third portion 323*a*, and closer to the first antenna element 2*a* than the second portion 312*b*.

With this configuration, as illustrated in FIG. 7, the space between the first portion 312*a* and the edge 313 of the slit 31*a* of the ground layer 31 and the space between the third portion 323*a* and the edge 322 of the slit 32*a* of the ground layer 32 face each other in the thickness direction of the ground electrode 3 and thus form a space extending through the ground layers 31 and 32. However, the space between the second portion 312*b* and the edge 313 of the slit 31*a* of the ground layer 31 and the space between the fourth portion 323*b* and the edge 322 of the slit 32*a* of the ground layer 32 do not overlap each other in the thickness direction of the ground electrode 3 and thus do not form a space extending through the ground layers 31 and 32. In other words, the first protrusion 51 of the ground layer 31 and the second protrusion 52 of the ground layer 32 overlap each other in the thickness direction of the ground electrode 3 with a specified distance therebetween.

As illustrated in FIG. 7A, the first portion 312*a* of the edge 312 on the first antenna element 2*a* side of the slit 31*a* overlaps the edge 322 on the first antenna element 2*a* side of the slit 32*a* in the thickness direction of the ground electrode 3. As illustrated in FIG. 7B, the third portion 323*a* of the edge 323 on the second antenna element 2*b* side of the slit 32*a* overlaps the edge 313 on the second antenna element 2*b* side of the slit 31*a* in the thickness direction of the ground electrode 3.

In the slit 33*a*, the edge 332 on the first antenna element 2*a* side of the slit 33*a* overlaps the first portion 312*a* of the edge 312 on the first antenna element 2*a* side of the slit 31*a* and the edge 322 on the first antenna element 2*a* side of the slit 32*a* in the thickness direction of the ground electrode 3. The edge 333 on the second antenna element 2*b* side of the slit 33*a* overlaps the third portion 323*a* of the edge 323 on the second antenna element 2*b* side of the slit 32*a* and the edge 313 on the second antenna element 2*b* side of the slit 31*a* in the thickness direction of the ground electrode 3.

In the slit 34*a*, the edge 342 on the first antenna element 2*a* side of the slit 34*a* overlaps the first portion 312*a* of the edge 312 on the first antenna element 2*a* side of the slit 31*a* and the edge 322 on the first antenna element 2*a* side of the slit 32*a* in the thickness direction of the ground electrode 3. The edge 343 on the second antenna element 2*b* side of the slit 34*a* overlaps the third portion 323*a* of the edge 323 on the second antenna element 2*b* side of the slit 32*a* and the edge 313 on the second antenna element 2*b* side of the slit 31*a* in the thickness direction of the ground electrode 3.

In the ground electrode 3, the space surrounded by the open end 311 of the slit 31*a* of the ground layer 31, the edge 322 on the first antenna element 2*a* side of the ground layer 32, the edge 313 on the second antenna element 2*b* side of the ground layer 31, and the closed end 314 of the ground layer 31 form a slit structure 4 in a plane orthogonal to the thickness direction of the ground electrode 3. The slit structure 4 includes an open end 40, an edge 41 on the first antenna element 2*a* side, and an edge 42 on the second antenna element 2*b* side. The open end 40 is defined by the open end 311 of the slit 31*a* of the ground layer 31. The edge 41 on the first antenna element 2*a* side is defined by the edge 322 on the first antenna element 2*a* side of the ground layer 32. The edge 42 on the second antenna element 2*b* side is defined by the edge 313 on the second antenna element 2*b* side of the ground layer 31. In the present embodiment, the shape of the slit structure 4 in a plane orthogonal to the thickness direction of the ground electrode 3 is the same as that of the slits 33*a* and 34*a* of the ground layers 33 and 34. The slit structure 4 is defined by the slits 31*a* to 34*a*. The slits 31*a* to 34*a* are located in the center portions 31*b* to 34*b* of the ground layers 31 to 34. The center portions 31*b* to 34*b* of the ground layers 31 to 34 are portions of the ground electrode 3 between the first antenna element 2*a* and the second antenna element 2*b*. The slit structure 4 is located between the first antenna element 2*a* and the second antenna element 2*b*.

In the ground electrode 3, the ground layer 31 has the first protrusion 51. The first protrusion 51 extends from the edge 322 on the first antenna element 2*a* side of the ground layer 32 toward the second antenna element 2*b* in a plane orthogonal to the thickness direction of the ground electrode 3. The ground layer 32 has the second protrusion 52. The second protrusion 52 extends from the edge 313 on the second antenna element 2*b* side of the ground layer 31 toward the first antenna element 2*a* in a plane orthogonal to the thickness direction of the ground electrode 3. The first protrusion 51 of the ground layer 31 and the second protrusion 52 of the ground layer 32 overlap each other in the thickness direction of the ground electrode 3 with a specified distance therebetween. The first protrusion 51 and the second protrusion 52 form an opposing structure 5.

The opposing structure 5 is located in the slit structure 4 in a plane orthogonal to the thickness direction of the ground electrode 3. In the present embodiment, the opposing structure 5 includes one set of the first protrusion 51 and the second protrusion 52. As described above, the second portion 312*b* is closer to the open end 311 of the slit 31*a* than the center of the slit 31*a*, and the fourth portion 323*b* is closer to the open end 321 of the slit 32*a* than the center of the slit 32*a*. Hence, the first protrusion 51 and the second protrusion 52 are closer to the open end 40 of the slit structure 4 than the center of the slit structure 4. In the present embodiment, the second portion 312*b* is located at the open end 311 of the slit 31*a*, and the fourth portion 323*b* is located at the open end 321 of the slit 32*a*. Hence, the first protrusion 51 and the second protrusion 52 are located at the open end 40 of the slit structure 4.

In FIG. 7, the lengths of the first protrusion 51 and the second protrusion 52 are equal to each other. Each of the lengths of the first protrusion 51 and the second protrusion 52 is shorter than or equal to half the length of the slit structure 4. Accordingly, in the opposing structure 5, the area of the overlap between the first protrusion 51 and the second protrusion 52 as viewed in the thickness direction of the ground electrode 3 is smaller than or equal to half the area of the slit structure 4. In other words, as viewed in the thickness direction of the ground electrode 3, the area of the portion between the second portion 312*b* of the slit 31*a* and the fourth portion 323*b* of the slit 32*a* in the ground electrode 3 is smaller than or equal to half the area of the portion between the edge 313 on the second antenna element 2*b* side of the slit 31*a* and the edge 322 on the first antenna element 2*a* side of the slit 32*a* in the ground electrode 3.

In the ground electrode 3, the ground layers 31 to 34 have the respective slits 31*a* to 34*a*, forming the slit structure 4 and the opposing structure 5 illustrated in FIGS. 1 to 3.

In the antenna device 1 described above, the ground electrode 3 includes the slit structure 4 and the opposing structure 5 in the slit structure 4. The opposing structure 5 includes the first protrusion 51 extending from the first edge 41 on the first antenna element 2*a* side of the slit structure 4 toward the second antenna element 2*b* and the second protrusion 52 extending from the second edge 42 on the second antenna element 2*b* side of the slit structure 4 toward the first antenna element 2*a* and overlapping the first protrusion 51. The first protrusion 51 and the second protrusion 52 in the opposing structure 5 can form capacitive coupling within the slit structure 4.

The slit structure 4 is provided to improve the isolation between the first antenna element 2*a* and the second antenna element 2*b*. The length of the slit structure 4 is determined in consideration of the improvement in the isolation between the first antenna element 2*a* and the second antenna element 2*b*. In the present embodiment, the slit structure 4 has a length adapted to a wavelength corresponding to the first frequency bandwidth. As an example, the length of the slit structure 4 is determined based on the electrical length being one-fourth of a wavelength corresponding to the first frequency bandwidth. In the present embodiment, the slit structure 4 includes the opposing structure 5. In the antenna device 1, the area where radio waves can pass through in the slit structure 4 can be smaller than in a configuration without the opposing structure 5 in the slit structure 4. The opposing structure 5 functions as a capacitor having a capacitance, and the first protrusion 51 and the second protrusion 52 in the opposing structure 5 are opposed to each other in the thickness direction of the ground electrode 3 which is the thickness direction of the slit structure 4. Thus, the antenna device 1 can achieve the electrical length being one-fourth of the wavelength corresponding to the first frequency bandwidth even though the length of the slit structure 4 is shorter than in a configuration without the opposing structure 5 in the slit structure 4. Specifically, since the slit structure 4 of the antenna device 1 includes the opposing structure 5, the length of the slit structure 4 is shorter than one-fourth of the wavelength corresponding to the first frequency bandwidth. This configuration reduces the possibility of radio waves from the first and second antenna elements 2*a* and 2*b* passing through the slit structure 4 and reaching the rear sides of the first and second antenna elements 2*a* and 2*b*. As described above, in the antenna device 1 of the present embodiment, the leakage of radio waves toward the rear sides of the antenna elements can be lower while the isolation between the antenna elements is improved.

1.1.2 Evaluation

The antenna device 1 of the present embodiment radiates radio waves in the first frequency bandwidth (a frequency bandwidth around 6.5 GHZ) and the second frequency bandwidth (a frequency bandwidth around 8.0 GHZ). The slit structure 4 of the ground electrode 3 has a length adapted to a wavelength corresponding to the first frequency bandwidth to improve the isolation between the first antenna element 2*a* and the second antenna element 2*b* in the first frequency bandwidth. To check the effects of the improvement, the isolation of the antenna device 1 of the present embodiment is measured. The isolation measurement is conducted on the antenna device 1 of the present embodiment and the antenna devices of Comparative Examples 1 and 2. The antenna substrate of Comparative Example 1 is the same as that of the antenna device 1 except that it does not include the slit structure 4. The antenna substrate of Comparative Example 2 is the same as that of the antenna device 1 except that it does not have an opposing structure 5, and that the length of the slit structure 4 is equal to one-fourth of the wavelength corresponding to the first frequency bandwidth.

Figure 10:
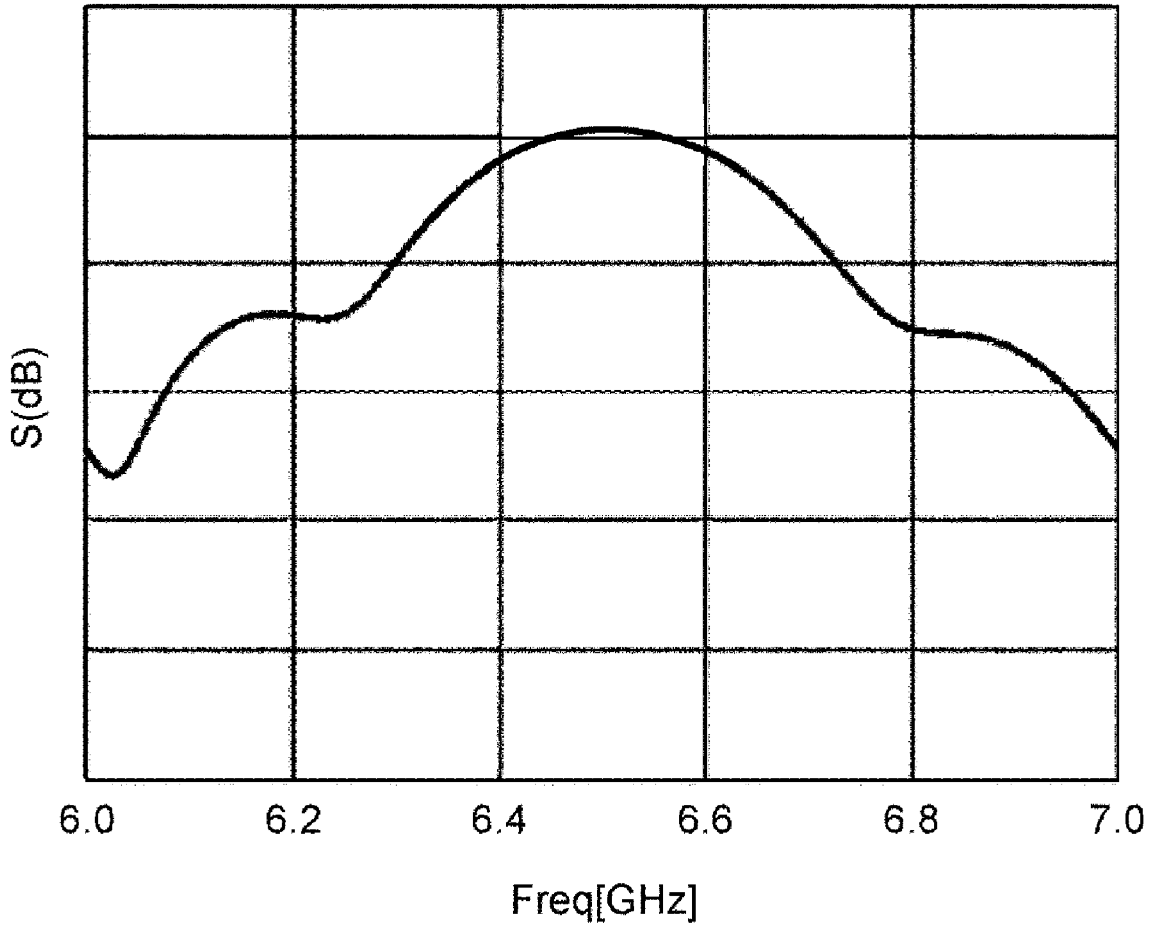
FIG. 10 is a graph illustrating the results of an isolation measurement for an antenna device of Comparative Example 1.
Figure 11:
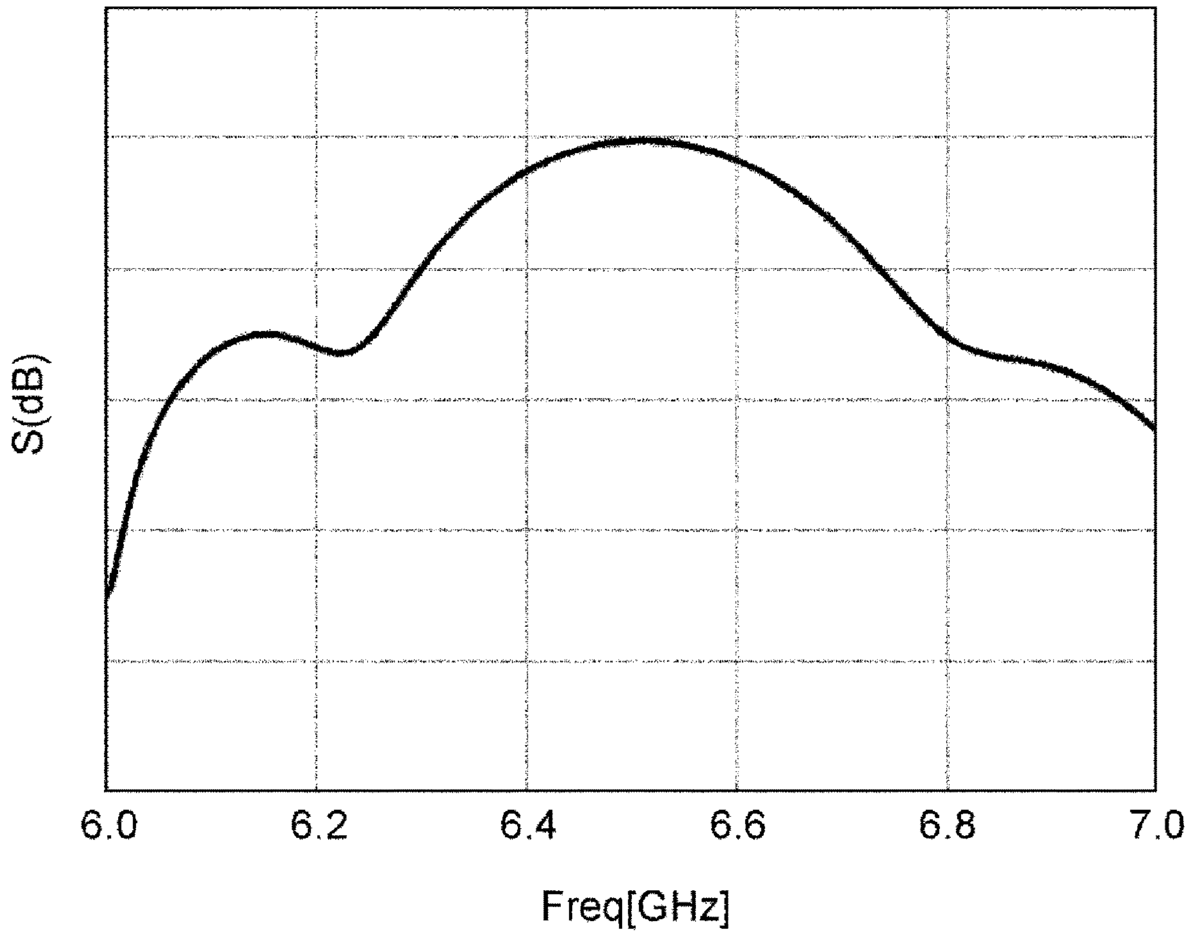
FIG. 11 is a graph illustrating the results of an isolation measurement for an antenna device of Comparative Example 2.
Figure 12:
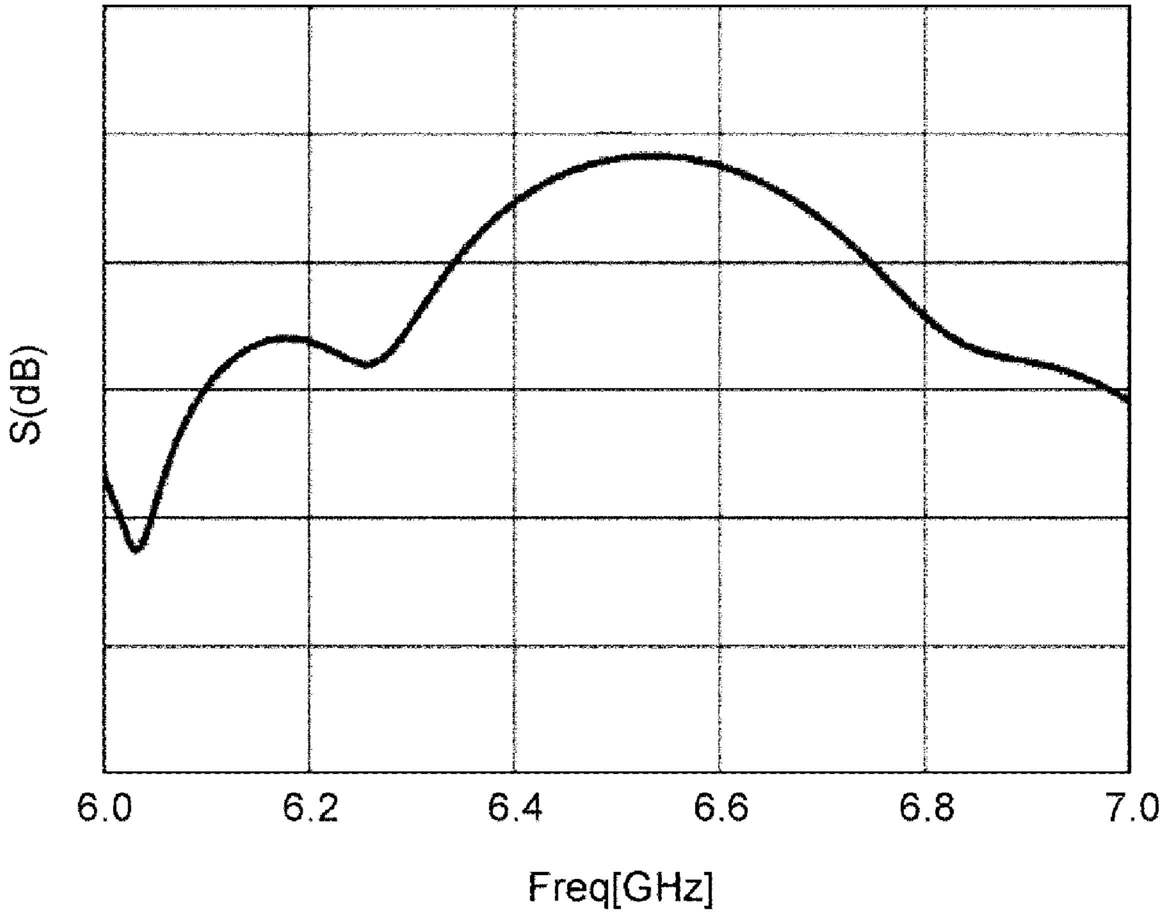
FIG. 12 is a graph illustrating the results of an isolation measurement for the antenna device of Embodiment 1.

FIG. 10 is a graph illustrating the results of an isolation measurement for the antenna device of Comparative Example 1. FIG. 11 is a graph illustrating the results of an isolation measurement for the antenna device of Comparative Example 2. FIG. 12 is a graph illustrating the results of an isolation measurement for the antenna device 1 of Embodiment 1. Specifically, in the graphs of FIGS. 10 to 12, the horizontal axis represents frequency, and the vertical axis represents isolation, and the higher the isolation, in other words, the more the isolation is improved, the lower position the value is plotted at. The isolation is measured in the frequency range of 6.0 GHz to 7.0 GHz.

As clearly seen in FIGS. 10 to 12, it is confirmed that the isolation in the antenna device 1 of the present embodiment is improved around 6.5 GHZ. In FIG. 10 corresponding to Comparative Example 1, the isolation around 6.5 GHz is 19.4 dB. In FIG. 11 corresponding to Comparative Example 2, the isolation around 6.5 GHz is 20.2 dB. In FIG. 12 corresponding to the antenna device 1 of the present embodiment, the isolation around 6.5 GHz is 21.9 dB.

As described above, in the antenna device 1 of the present embodiment, the isolation between the first antenna element 2*a* and the second antenna element 2*b* around 6.5 GHZ corresponding to the first frequency bandwidth is improved, compared with the configuration of a ground electrode 3 with only the slit structure 4.

In addition, peak efficiency and peak gain are measured for the antenna device 1 of the present embodiment and the antenna devices of Comparative Examples 1 and 2. The measurement of peak efficiency and peak gain is conducted on a peak around 6.5 GHz corresponding to the first frequency bandwidth and a peak around 8.0 GHZ corresponding to the second frequency bandwidth. From the results of peak efficiency measurements, it is confirmed that the peak efficiencies of the antenna device 1 of the present embodiment and the antenna device of Comparative Examples 2 are improved compared with that of the antenna device of Comparative Example 1, especially, on the peak around 6.5 GHz. This is because the isolation is improved around 6.5 GHz in the antenna device 1 of the present embodiment and the antenna device of Comparative Example 2. However, the results of peak gain measurements show that the peak gain of the peak around 8.0 GHz is lower in Comparative Example 2 than in Comparative Example 1. This is probably because of the effects of the leakage of radio waves in the second frequency bandwidth from the slit structure 4. In contrast, the peak gain of the peak around 8.0 GHz of the antenna device 1 of the present embodiment is at the same degree as that of Comparative Example 1. This is probably because the slit structure 4 includes the opposing structure 5, and the length of the slit structure 4 is shorter than that of Comparative Example 2. In summary, in the antenna device 1 of the present embodiment, the isolation is improved around 6.5 GHZ as in Comparative Example 2, and in addition, the peak gain of the peak around 8.0 GHz is improved compared with that of Comparative Example 2.

1.1.3 Advantageous Effects and Other Information

As described above, the antenna device 1 includes the first antenna element 2*a*, the second antenna element 2*b*, and the ground electrode 3 located on the rear sides of the first antenna element 2*a* and the second antenna element 2*b* and coupled to the first antenna element 2*a* and the second antenna element 2*b*. The ground electrode 3 includes the first and second ground layers (ground layers 31, 32) aligned in the thickness direction of the ground electrode 3. The first ground layer (ground layer 31) has the first slit (slit 31*a*) located between the first antenna element 2*a* and the second antenna element 2*b* as viewed in the thickness direction of the ground electrode 3, extending from the edge 310*a* of the first ground layer (ground layer 31) corresponding to the specified edge 3*a* of the ground electrode 3 in the second direction intersecting the first direction parallel to a line connecting the first antenna element 2*a* and the second antenna element 2*b*, and including the first edge 312 on the first antenna element 2*a* side and the second edge 313 on the second antenna element 2*b* side. The second ground layer (ground layer 32) has the second slit (slit 32*a*) extending from the edge 320*a* of the second ground layer (ground layer 32) corresponding to the specified edge 3*a* of the ground electrode 3 in the second direction, aligned with the first slit (slit 31*a*) in the thickness direction of the ground electrode 3, and including the third edge 322 on the first antenna element 2*a* side and the fourth edge 323 on the second antenna element 2*b* side. The first edge 312 of the first slit (slit 31*a*) includes the first portion 312*a* and the second portion 312*b* closer to the second edge 313 than the first portion 312*a*. The fourth edge 323 of the second slit (slit 32*a*) includes the third portion 323*a* located side by side with the first portion 312*a* in the first direction and closer to the second antenna element 2*b* than the first portion 312*a* and includes the fourth portion 323*b* located side by side with the second portion 312*b* in the first direction, closer to the third edge 322 than the third portion 323*a*, and closer to the first antenna element 2*a* than the second portion 312*b*. This configuration enables a reduction in the leakage of radio waves toward the rear sides of the first and second antenna elements 2*a* and 2*b* while improving the isolation between the first and second antenna elements 2*a* and 2*b*.

In the antenna device 1, the first portion 312*a* of the first edge 312 of the first slit (slit 31*a*) overlaps the third edge 322 of the second slit (slit 32*a*) in the thickness direction of the ground electrode 3. The third portion 323*a* of the fourth edge 323 of the second slit (slit 32*a*) overlaps the second edge 313 of the first slit (slit 31*a*) in the thickness direction of the ground electrode 3. This configuration makes the first slit (slit 31*a*) and the second slit (slit 32*a*) smaller.

In the antenna device 1, the ground electrode 3 includes the third ground layer (ground layer 33, 34) aligned with the first and second ground layers (ground layers 31, 32) in the thickness direction of the ground electrode 3. The third ground layer (ground layer 33, 34) includes the third slit (slit 33*a*, 34*a*) extending from the edge 330*a*, 340*a* of the third ground layer (ground layer 33, 34) corresponding to the specified edge of the ground electrode 3 in the second direction and aligned with the first and second slits (slits 31*a*, 32*a*) in the thickness direction of the ground electrode 3. This configuration, including a larger number of ground layers, enables a reduction in the leakage of radio waves toward the rear sides of the first and second antenna elements (the antenna elements 2*a*, 2*b*) while improving the isolation between the first and second antenna elements (the antenna elements 2*a*, 2*b*).

In the antenna device 1, the third slit (slit 33*a*, 34*a*) includes the fifth edge 332, 342 on the first antenna element 2*a* side and the sixth edge 333, 343 on the second antenna element 2*b* side. The fifth edge 332, 342 of the third slit (slit 33*a*, 34*a*) overlaps the first portion 312*a* of the first edge 312 of the first slit (slit 31*a*) and the third edge 322 of the second slit (slit 32*a*) in the thickness direction of the ground electrode 3. The sixth edge 333, 343 of the third slit (slit 33*a*, 34*a*) overlaps the third portion 323*a* of the fourth edge 323 of the second slit (slit 32*a*) and the second edge 312 of the first slit (slit 31*a*) in the thickness direction of the ground electrode 3. This configuration makes the third slit (the slit 33*a*, 34*a*) smaller.

In the antenna device 1, the first ground layer (ground layer 31) and the second ground layer (ground layer 32) are next to each other. This configuration enables a further reduction in the leakage of radio waves toward the rear sides of the antenna elements 2*a* and 2*b*.

In the antenna device 1, the first ground layer (ground layer 31) is the closest to the first antenna element 2*a* and the second antenna element 2*b* among the first to third ground layers (ground layers 31 to 34). Following the first ground layer (ground layer 31), the second ground layer (ground layer 32) is the next closest layer to the first antenna element 2*a* and the second antenna element 2*b* among the first to third ground layers (ground layers 31 to 34). This configuration enables a further reduction in the leakage of radio waves toward the rear sides of the first and second antenna elements 2*a* and 2*b*.

In the antenna device 1, the second portion 312*b* is closer to the open end 311 of the first slit (slit 31*a*) than the first portion 312*a*. The fourth portion 323*b* is closer to the open end 321 of the second slit (slit 32*a*) than the third portion 323*a*. This configuration enables a further reduction in the leakage of radio waves toward the rear sides of the first and second antenna elements 2*a* and 2*b*.

In the antenna device 1, the second portion 312*b* is closer to the open end 311 of the first slit (slit 31*a*) than the center of the first slit (slit 31*a*). The fourth portion 323*b* is closer to the open end 321 of the second slit (slit 32*a*) than the center of the second slit (slit 32*a*). This configuration enables a further reduction in the leakage of radio waves toward the rear sides of the first and second antenna elements 2*a* and 2*b*.

In the antenna device 1, the second portion 312*b* is located at the open end 311 of the first slit (slit 31*a*). The fourth portion 323*b* is located at the open end 321 of the second slit (slit 32*a*). This configuration enables a further reduction in the leakage of radio waves toward the rear sides of the first and second antenna elements 2*a* and 2*b*.

In the antenna device 1, the set of the first slit (slit 31*a*) and the second slit (slit 32*a*) includes one set of the second portion 312*b* and the fourth portion 323*b*. This configuration enables a further reduction in the leakage of radio waves toward the rear sides of the first and second antenna elements 2*a* and 2*b*.

In the antenna device 1, as viewed in the thickness direction of the ground electrode 3, the area of the portion between the second portion 312*b* of the first edge 312 of the first slit (slit 31*a*) and the fourth portion 323*b* of the fourth edge 323 of the second slit (slit 32*a*) in the ground electrode 3 is smaller than or equal to half the area of the portion between the second edge 313 of the first slit (slit 31*a*) and the third edge 322 of the second slit (slit 32*a*) in the ground electrode 3. This configuration enables a further reduction in the leakage of radio waves toward the rear sides of the first and second antenna elements 2*a* and 2*b*.

In the antenna device 1, each of the first antenna element 2*a* and the second antenna element 2*b* supports the first frequency bandwidth and the second frequency bandwidth higher than the first frequency bandwidth. Each of the first slit (slit 31*a*) and the second slit (slit 32*a*) has a length adapted to a wavelength corresponding to the first frequency bandwidth. This configuration enables a reduction in the leakage of radio waves in the second frequency bandwidth toward the rear sides of the first and second antenna elements 2*a* and 2*b* while improving the isolation between the first and second antenna elements 2*a* and 2*b* in the first frequency bandwidth.

In the antenna device 1, each of the first antenna element 2*a* and the second antenna element 2*b* is a planar antenna. This configuration enables downsizing of the antenna device 1.

1.2 Embodiment 2

1.2.1 Configuration

Figure 13:
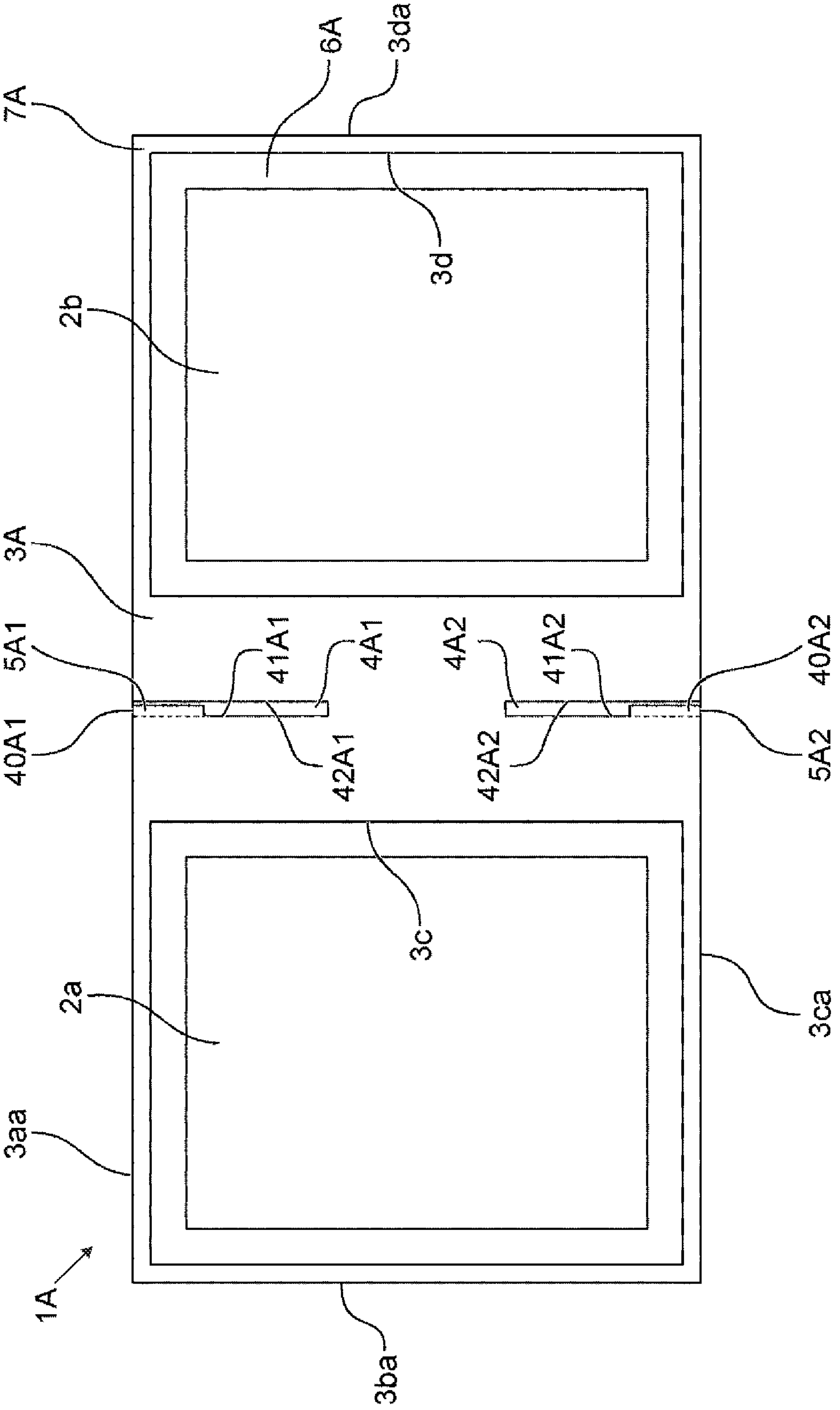
FIG. 13 is a plan view of a configuration example of an antenna device according to Embodiment 2.

FIG. 13 is a plan view of a configuration example of an antenna device 1A according to Embodiment 2. The antenna device 1A in FIG. 13 includes a first antenna element 2*a*, a second antenna element 2*b*, and a substrate 7A on which the first antenna element 2*a* and the second antenna element 2*b* are mounted.

As illustrated in FIG. 13, the substrate 7A includes a ground electrode 3A and dielectric layers 6A. The substrate 7A has a configuration utilizing a multilayer substrate.

Figure 14:
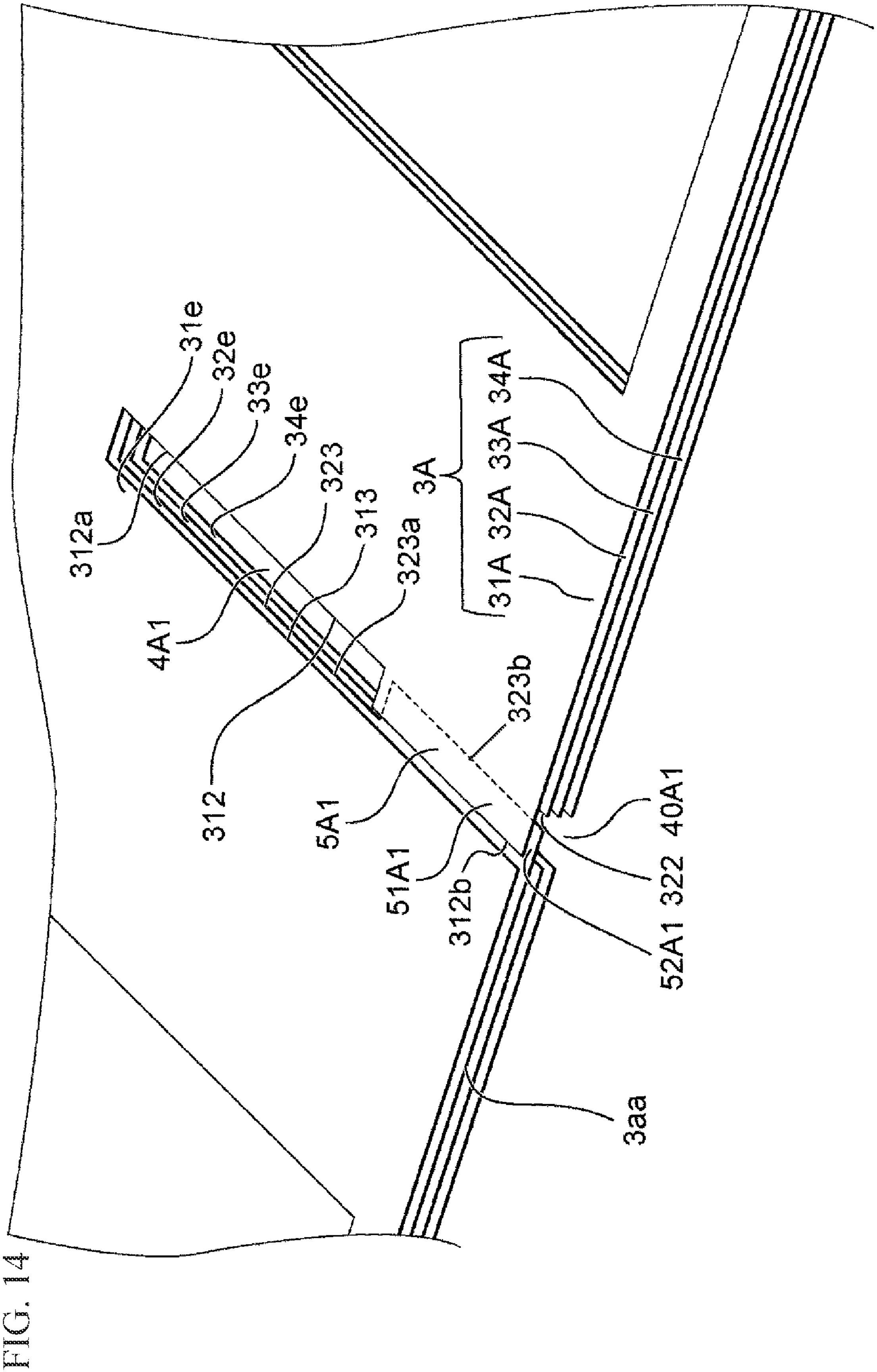
FIG. 14 is an enlarged perspective view of part of the antenna device in FIG. 13.
Figure 15:
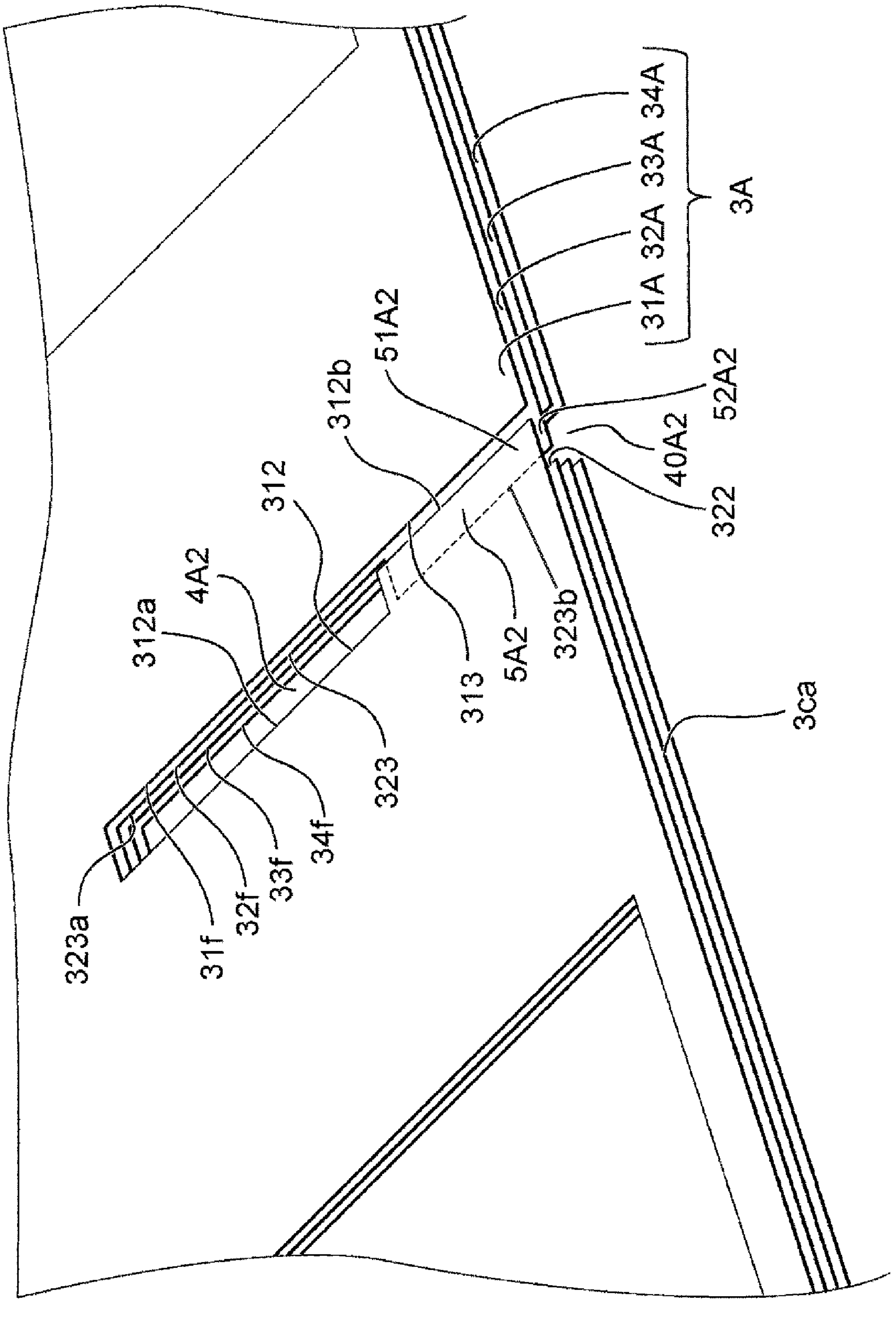
FIG. 15 is another enlarged perspective view of part of the antenna device in FIG. 13.

The ground electrode 3A in FIG. 13 differs from the ground electrode 3 in FIG. 1 in that the ground electrode 3A includes a plurality of slit structures (a first slit structure 4A1 and a second slit structure 4A2) and a plurality of opposing structures (a first opposing structure 5A1 and a second opposing structure 5A2). FIG. 14 is an enlarged perspective view of part of the antenna device 1A. More specifically, FIG. 14 is an enlarged perspective view of part of the antenna device 1A, illustrating the first slit structure 4A1 and its vicinities. FIG. 15 is another enlarged perspective view of part of the antenna device 1A. More specifically, FIG. 15 is an enlarged perspective view of part of the antenna device 1A, illustrating the second slit structure 4A2 and its vicinities.

As illustrated in FIG. 13, the ground electrode 3A is rectangular. The ground electrode 3A has a first edge 3*aa*, a second edge 3*ba*, a third edge 3*ca*, and a fourth edge 3*da*. The first edge 3*aa* and the third edge 3*ca* are opposed to each other and extend in the longitudinal direction of the ground electrode 3A. The second edge 3*ba* and the fourth edge 3*da* are opposed to each other and extend in the width direction of the ground electrode 3A. As illustrated in FIGS. 14 and 15, the ground electrode 3A includes a plurality of ground layers 31A to 34A. The ground layers 31A to 34A differ from the ground layers 31 to 34 in Embodiment 1 in that the ground layers 31A to 34A include two sets of slits 31*e* to 34*e* and slits 31*f* to 34*f*.

As illustrated in FIG. 13, the ground electrode 3A includes the first slit structure 4A1, the second slit structure 4A2, the first opposing structure 5A1, and the second opposing structure 5A2.

As illustrated in FIG. 14, the set of slits 31*e* to 34*e* defines the first slit structure 4A1 and the first opposing structure 5A1. The slits 31*e* to 34*e* have shapes similar to those of the slits 31*a* to 34*a*. In the slit 31*e*, a first portion 312*a* is located side by side with a third portion 323*a* in the first direction and closer to the first antenna element 2*a* than the third portion 323*a*. A second portion 312*b* is located side by side with a fourth portion 323*b* in the first direction, closer to a second edge 313 than the first portion 312*a*, and closer to the second antenna element 2*b* than the fourth portion 323*b*. In the slit 32*e*, the third portion 323*a* is located side by side with the first portion 312*a* in the first direction and closer to the second antenna element 2*b* than the first portion 312*a*. The fourth portion 323*b* is located side by side with the second portion 312*b* in the first direction, closer to the third edge 322 than the third portion 323*a*, and closer to the first antenna element 2*a* than the second portion 312*b*. In the present embodiment, each of the slits 31*e* to 34*e* has a length adapted to a wavelength corresponding to the first frequency bandwidth.

The first slit structure 4A1 extends from the first edge 3*aa* of the ground electrode 3A into the inside of the ground electrode 3A and has an open end 40A1. The first slit structure 4A1 is located between the first antenna element 2*a* and the second antenna element 2*b* and has a first edge 41A1 on the first antenna element 2*a* side and a second edge 42A1 on the second antenna element 2*b* side. The edge 41A1 on the first antenna element 2*a* side is defined by the edge 322 on the first antenna element 2*a* side of the ground layer 32A. The edge 42A1 on the second antenna element 2*b* side is defined by the edge 313 on the second antenna element 2*b* side of the ground layer 31.

The ground layer 31A has a first protrusion 51A1. The first protrusion 51A1 extends from the edge 322 on the first antenna element 2*a* side of the ground layer 32A toward the second antenna element 2*b* in a plane orthogonal to the thickness direction of the ground electrode 3A. The ground layer 32A has a second protrusion 52A1. The second protrusion 52A1 extends from the edge 313 on the second antenna element 2*b* side of the ground layer 31A toward the first antenna element 2*a* in a plane orthogonal to the thickness direction of the ground electrode 3A. The first protrusion 51A1 of the ground layer 31A and the second protrusion 52A1 of the ground layer 32A overlap each other in the thickness direction of the ground electrode 3A with a specified distance therebetween. The first protrusion 51A1 and the second protrusion 52A1 form the first opposing structure 5A1.

The first opposing structure 5A1 is located in the first slit structure 4A1 in a plane orthogonal to the thickness direction of the ground electrode 3A. In the present embodiment, the first opposing structure 5A1 includes one set of the first protrusion 51A1 and the second protrusion 52A1. The first protrusion 51A1 and the second protrusion 52A1 are located at the open end 40A1 of the first slit structure 4A1. The lengths of the first protrusion 51A1 and the second protrusion 52A1 are equal to each other. Each of the lengths of the first protrusion 51A1 and the second protrusion 52A1 is shorter than or equal to half the length of the first slit structure 4A1. Hence, as viewed in the thickness direction of the ground electrode 3A, the area of the overlap between the first protrusion 51A1 and the second protrusion 52A1 in the first opposing structure 5A1 is smaller than or equal to half the area of the first slit structure 4A1.

As illustrated in FIG. 15, the set of slits 31*f* to 34*f* defines the second slit structure 4A2 and the second opposing structure 5A2. The slits 31*f* to 34*f* have shapes similar to those of the slits 31*a* to 34*a*. In the slit 31*f*, a first portion 312*a* is located side by side with a third portion 323*a* in the first direction and closer to the first antenna element 2*a* than the third portion 323*a*. A second portion 312*b* is located side by side with a fourth portion 323*b* in the first direction, closer to a second edge 313 than the first portion 312*a*, and closer to the second antenna element 2*b* than the fourth portion 323*b*. In the slit 32*f*, the third portion 323*a* is located side by side with the first portion 312*a* in the first direction and closer to the second antenna element 2*b* than the first portion 312*a*. The fourth portion 323*b* is located side by side with the second portion 312*b* in the first direction, closer to the third edge 322 than the third portion 323*a*, and closer to the first antenna element 2*a* than the second portion 312*b*. In the present embodiment, each of the slits 31*f* to 34*f* has a length adapted to a wavelength corresponding to the second frequency bandwidth.

The second slit structure 4A2 extends from the third edge 3*ca* of the ground electrode 3A into the inside of the ground electrode 3A and has an open end 40A2. The second slit structure 4A2 is located between the first antenna element 2*a* and the second antenna element 2*b* and has a first edge 41A2 on the first antenna element 2*a* side and a second edge 42A2 on the second antenna element 2*b* side. The edge 41A2 on the first antenna element 2*a* side is defined by the edge 322 on the first antenna element 2*a* side of the ground layer 32A. The edge 42A1 on the first antenna element 2*a* side is defined by the edge 313 on the second antenna element 2*b* side of the ground layer 31A.

The ground layer 31A has a first protrusion 51A2. The first protrusion 51A2 extends from the edge 322 on the first antenna element 2*a* side of the ground layer 32A toward the second antenna element 2*b* in a plane orthogonal to the thickness direction of the ground electrode 3A. The ground layer 32A has a second protrusion 52A2. The second protrusion 52A2 extends from the edge 313 on the second antenna element 2*b* side of the ground layer 31A toward the first antenna element 2*a* in a plane orthogonal to the thickness direction of the ground electrode 3A. The first protrusion 51A2 of the ground layer 31A and the second protrusion 52A2 of the ground layer 32A overlap each other in the thickness direction of the ground electrode 3A with a specified distance therebetween. The first protrusion 51A2 and the second protrusion 52A2 form the second opposing structure 5A2.

The second opposing structure 5A2 is located in the second slit structure 4A2 in a plane orthogonal to the thickness direction of the ground electrode 3A. In the present embodiment, the second opposing structure 5A2 includes one set of the first protrusion 51A2 and the second protrusion 52A2. The first protrusion 51A2 and the second protrusion 52A2 are located at the open end 40A2 of the second slit structure 4A2. The lengths of the first protrusion 51A2 and the second protrusion 52A2 are equal to each other. Each of the lengths of the first protrusion 51A2 and the second protrusion 52A2 is shorter than or equal to half the length of the second slit structure 4A2. Hence, as viewed in the thickness direction of the ground electrode 3A, the area of the overlap between the first protrusion 51A2 and the second protrusion 52A2 in the second opposing structure 5A2 is smaller than or equal to half the area of the second slit structure 4A2.

Each of the first slit structure 4A1 and the second slit structure 4A2 is provided to improve the isolation between the first antenna element 2*a* and the second antenna element 2*b*. The first slit structure 4A1 has a length adapted to a wavelength corresponding to the first frequency bandwidth. As an example, the length of the first slit structure 4A1 is determined based on the electrical length being one-fourth of a wavelength corresponding to the first frequency bandwidth. The second slit structure 4A2 has a length adapted to a wavelength corresponding to the second frequency bandwidth. As an example, the length of the second slit structure 4A2 is determined based on the electrical length being one-fourth of a wavelength corresponding to the second frequency bandwidth.

The first slit structure 4A1 includes the first opposing structure 5A1. In the antenna device 1A, the area where radio waves pass through in the first slit structure 4A1 can be smaller than in a configuration without the first opposing structure 5A1 in the first slit structure 4A1. In addition, since the first opposing structure 5A1 functions as a capacitor having a capacitance, the antenna device 1A can achieve the electrical length being one-fourth of the wavelength corresponding to the first frequency bandwidth even though the first slit structure 4A1 is shorter than in a configuration without the first opposing structure 5A1 in the first slit structure 4A1. Hence, this configuration reduces the possibility of radio waves from the first and second antenna elements 2*a* and 2*b* passing through the first slit structure 4A1 and reaching the rear sides of the first and second antenna elements 2*a* and 2*b*.

The second slit structure 4A2 includes the second opposing structure 5A2. In the antenna device 1A, the area where radio waves pass through in the second slit structure 4A2 can be smaller than in a configuration without the second opposing structure 5A2 in the second slit structure 4A2. In addition, since the second opposing structure 5A2 functions as a capacitor having a capacitance, the antenna device 1A can achieve the electrical length being one-fourth of the wavelength corresponding to the second frequency bandwidth even though the second slit structure 4A2 is shorter than in a configuration without the second opposing structure 5A2 in the second slit structure 4A2. Hence, this configuration reduces the possibility of radio waves from the first and second antenna elements 2*a* and 2*b* passing through the second slit structure 4A2 and reaching the rear sides of the first and second antenna elements 2*a* and 2*b*.

As described above, in the antenna device 1A of the present embodiment, the leakage of radio waves toward the rear sides of the antenna elements can be lower while the isolation between the antenna elements (first and second antenna elements 2*a* and 2*b*) is improved.

1.2.2 Evaluation

The antenna device 1A of the present embodiment radiates radio waves in the first frequency bandwidth (a frequency bandwidth around 6.5 GHZ) and the second frequency bandwidth (a frequency bandwidth around 8.0 GHz). The first slit structure 4A1 of the ground electrode 3A has a length adapted to the wavelength corresponding to the first frequency bandwidth to improve the isolation between the first antenna element 2*a* and the second antenna element 2*b* in the first frequency bandwidth. The second slit structure 4A2 of the ground electrode 3A has a length adapted to the wavelength corresponding to the second frequency bandwidth to improve the isolation between the first antenna element 2*a* and the second antenna element 2*b* in the second frequency bandwidth. To check the effects of the improvement, the isolation of the antenna device 1A of the present embodiment is measured. The isolation measurement is conducted on the antenna device 1A of the present embodiment and the antenna device 1 of Embodiment 1 described earlier.

Figure 16:
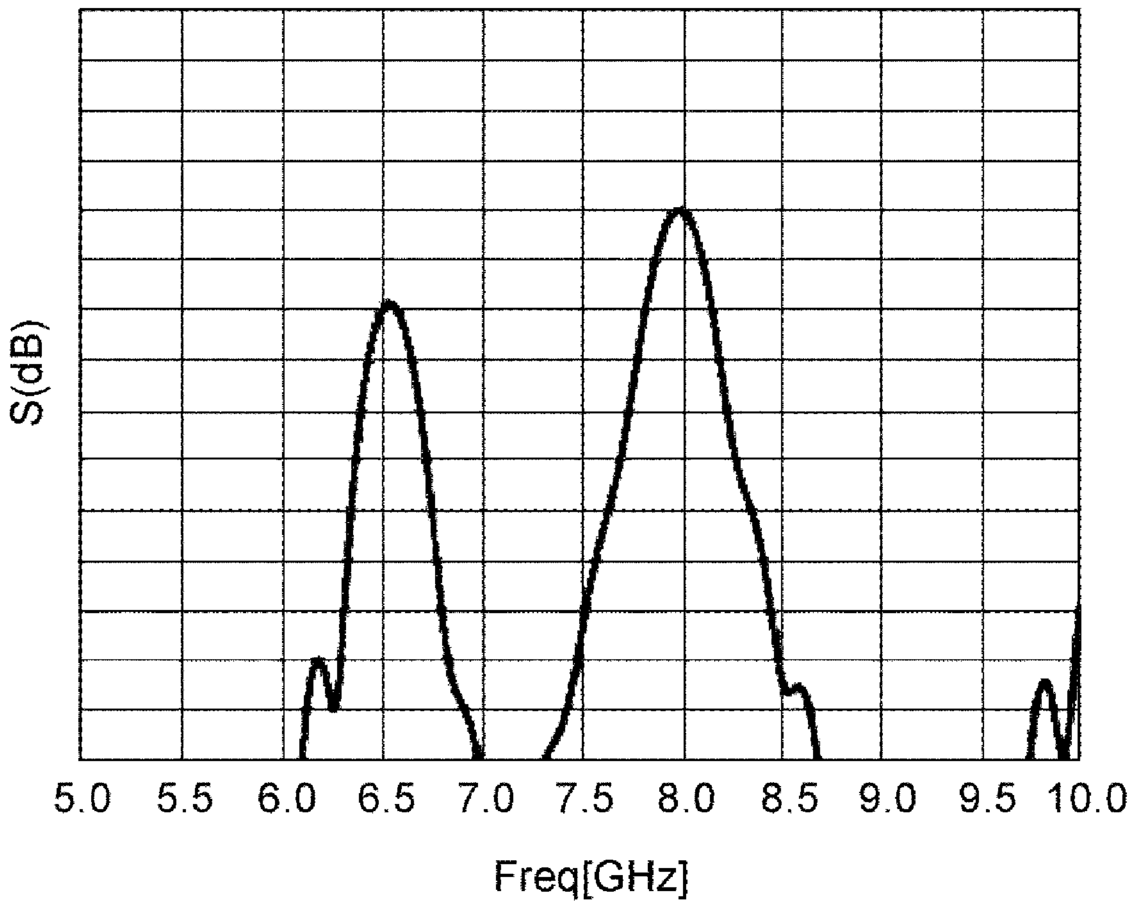
FIG. 16 is a graph illustrating the results of an isolation measurement for the antenna device of Embodiment 1.
Figure 17:
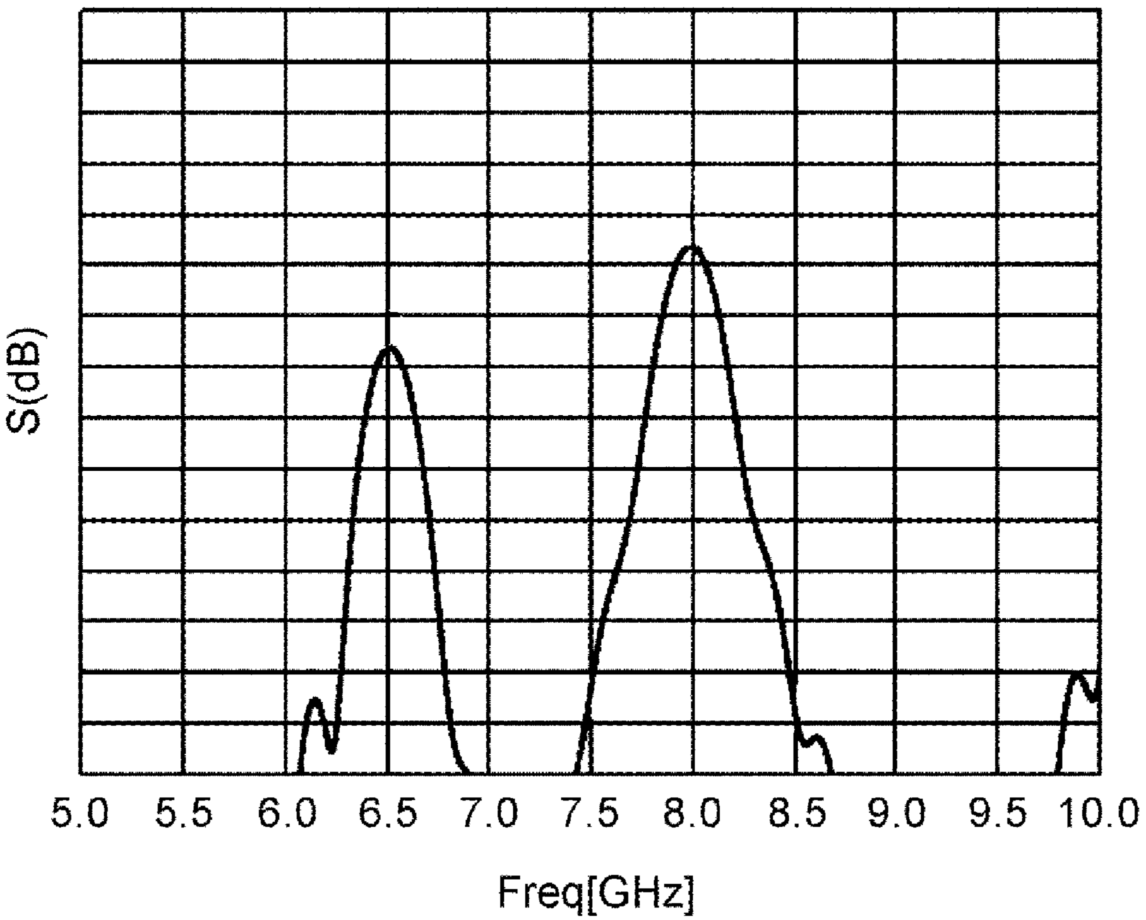
FIG. 17 is a graph illustrating the results of an isolation measurement for the antenna device of Embodiment 2.

FIG. 16 is a graph illustrating the results of the isolation measurement for the antenna device 1 of Embodiment 1. FIG. 17 is a graph illustrating the results of the isolation measurement for the antenna device 1A of Embodiment 2. Specifically, in the graphs of FIGS. 16 and 17, the horizontal axis represents frequency, and the vertical axis represents isolation, and the higher the isolation, in other words, the more the isolation is improved, the lower position the value is plotted at. The isolation is measured in the frequency range of 5.0 GHz to 10.0 GHZ.

As clearly seen in FIGS. 16 and 17, it is confirmed that the isolation is improved around 6.5 GHZ and around 8.0 GHz in the antenna device 1A. In FIG. 16, the isolation around 6.5 GHZ is 21.9 dB, and the isolation around 8.0 GHZ is 17.9 dB. In FIG. 17, the isolation around 6.5 GHZ is 23.2 dB, and the isolation around 8.0 GHz is 19.2 dB.

1.2.3 Advantageous Effects and Other Information

In the antenna device 1A described above, each of the first antenna element 2*a* and the second antenna element 2*b* supports the first frequency bandwidth and the second frequency bandwidth higher than the first frequency bandwidth. The ground electrode 3A has the first set of the first and second slits (slits 31*e*, 32*e*) and the second set of the first and second slits (slits 31*f*, 32*f*). Each of the first and second slits (slits 31*e*, 32*e*) included in the first set has a length adapted to the wavelength corresponding to the first frequency bandwidth. Each of the first and second slits (slit 31*f*, 32*f*) included in the second set has a length adapted to the wavelength corresponding to the second frequency bandwidth. This configuration enables a reduction in the leakage of radio waves toward the rear sides of the antenna elements (first and second antenna elements 2*a*, 2*b*) while improving the isolation between the antenna elements (first and second antenna elements 2*a*, 2*b*) in the first frequency bandwidth and the second frequency bandwidth.

1.3 Embodiment 3

Figure 18:
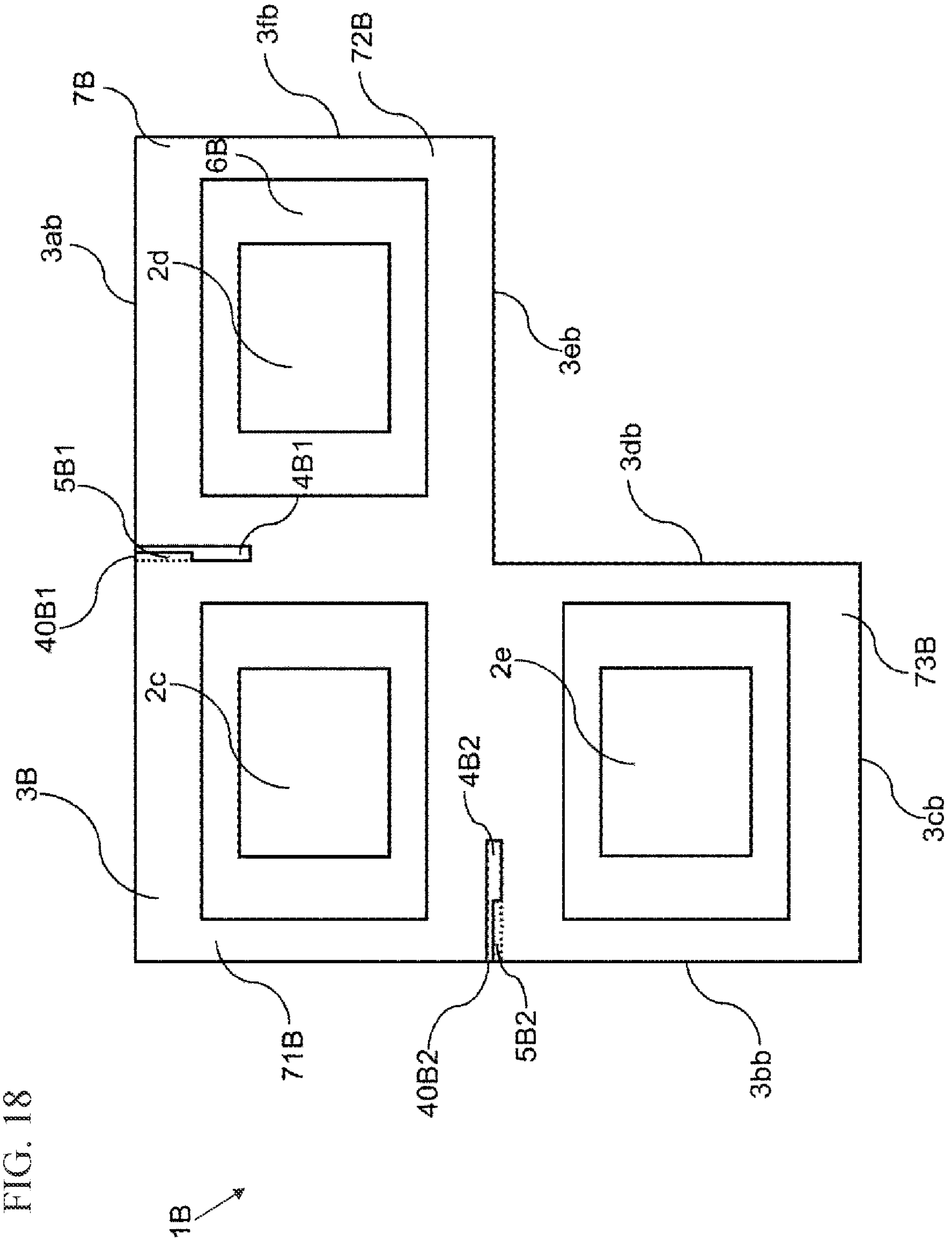
FIG. 18 is a plan view of a configuration example of an antenna device according to Embodiment 3.

FIG. 18 is a plan view of a configuration example of an antenna device 1B according to Embodiment 3. The antenna device 1B in FIG. 18 includes a plurality of (three in FIG. 16) antenna elements 2*c* to 2*e* and a substrate 7B on which the plurality of antenna elements 2*c* to 2*e* are mounted.

Each of the antenna elements 2*c* to 2*e* is a planar antenna (for example, a patch antenna). Each of the antenna elements 2*c* to 2*e* supports a first frequency bandwidth and a second frequency bandwidth higher than the first frequency bandwidth. The first frequency bandwidth and the second frequency bandwidth are, for example, frequency bandwidths used for radio communication in UWB. As an example, the center frequency of the first frequency bandwidth is 6.5 GHz, and the center frequency of the second frequency bandwidth is 8.0 GHZ. Each of the antenna elements 2*c* to 2*e* can be a conventional publicly-known planar antenna, and hence, detailed description is omitted.

The substrate 7B has an L-shaped plate shape. The substrate 7B has a first portion 71B, a second portion 72B, and a third portion 73B. The first portion 71B is square. The first portion 71B has a first edge and a second edge (the left edge and the right edge in FIG. 18) in a first direction (the right-left direction in FIG. 18) orthogonal to the thickness direction of the first portion 71B and a first edge and a second edge (the upper edge and the lower edge in FIG. 18) in a second direction (the up-down direction in FIG. 18) orthogonal to the thickness direction of the first portion 71B and the first direction. The second portion 72B protrudes from the second edge in the first direction (the right edge in FIG. 18) of the first portion 71B. The third portion 73B protrudes from the second edge in the second direction (the lower edge in FIG. 18) of the first portion 71B.

On the substrate 7B, the first to third portions 71B, 72B, and 73B have three antenna elements 2*c*, 2*d*, and 2*e*, respectively. The two antenna elements 2*c* and 2*d* in the first portion 71B and the second portion 72B are aligned in the first direction of the first portion 71B (the right-left direction in FIG. 18). The two antenna elements 2*c* and 2*e* in the first portion 71B and the third portion 73B are aligned in the second direction of the first portion 71B (the up-down direction in FIG. 18). As described above, the three antenna elements 2*c* to 2*e* are located so as to form an L shape on the substrate 7B as viewed in the thickness direction of the substrate 7B. This configuration enables the detection of the angle of arrival (AoA) both in the first direction and in the second direction.

As illustrated in FIG. 18, the substrate 7B includes a ground electrode 3B and dielectric layers 6B. The substrate 7B has a configuration utilizing a multilayer substrate.

The ground electrode 3B has an L shape as with the substrate 7B. The ground electrode 3B has a first edge 3*ab*, a second edge 3*bb*, a third edge 3*cb*, a fourth edge 3*db*, a fifth edge 3*eb*, and a sixth edge 3*fb*. The first edge 3*ab* is located at a first end in the second direction of the substrate 7B (on the upper end side in FIG. 18) and serves as edges of the first portion 71B and the second portion 72B. The second edge 3*bb* is located on a first end side in the second direction of the substrate 7B (on the left end side in FIG. 18) and serves as edges of the first portion 71B and the third portion 73B. The third edge 3*cb* is located at a second end in the second direction (on the lower end side in FIG. 18) of the substrate 7B and serves as an edge of the third portion 73B. The fourth edge 3*db* is located on a second end side in the first direction (on the right end side in FIG. 18) of the substrate 7B and serves as an edge of the third portion 73B. The fifth edge 3*eb* is located at a second end in the second direction (on the lower end side in FIG. 18) of the substrate 7B and serves as an edge of the second portion 72B. The sixth edge 3*fb* is located on a second end side in the first direction (on the right end side in FIG. 18) of the substrate 7B and serves as an edge of the second portion 72B.

As illustrated in FIG. 18, the ground electrode 3B includes two slit structures 4B1 and 4B2 and two opposing structures 5B1 and 5B2.

Figure 19:
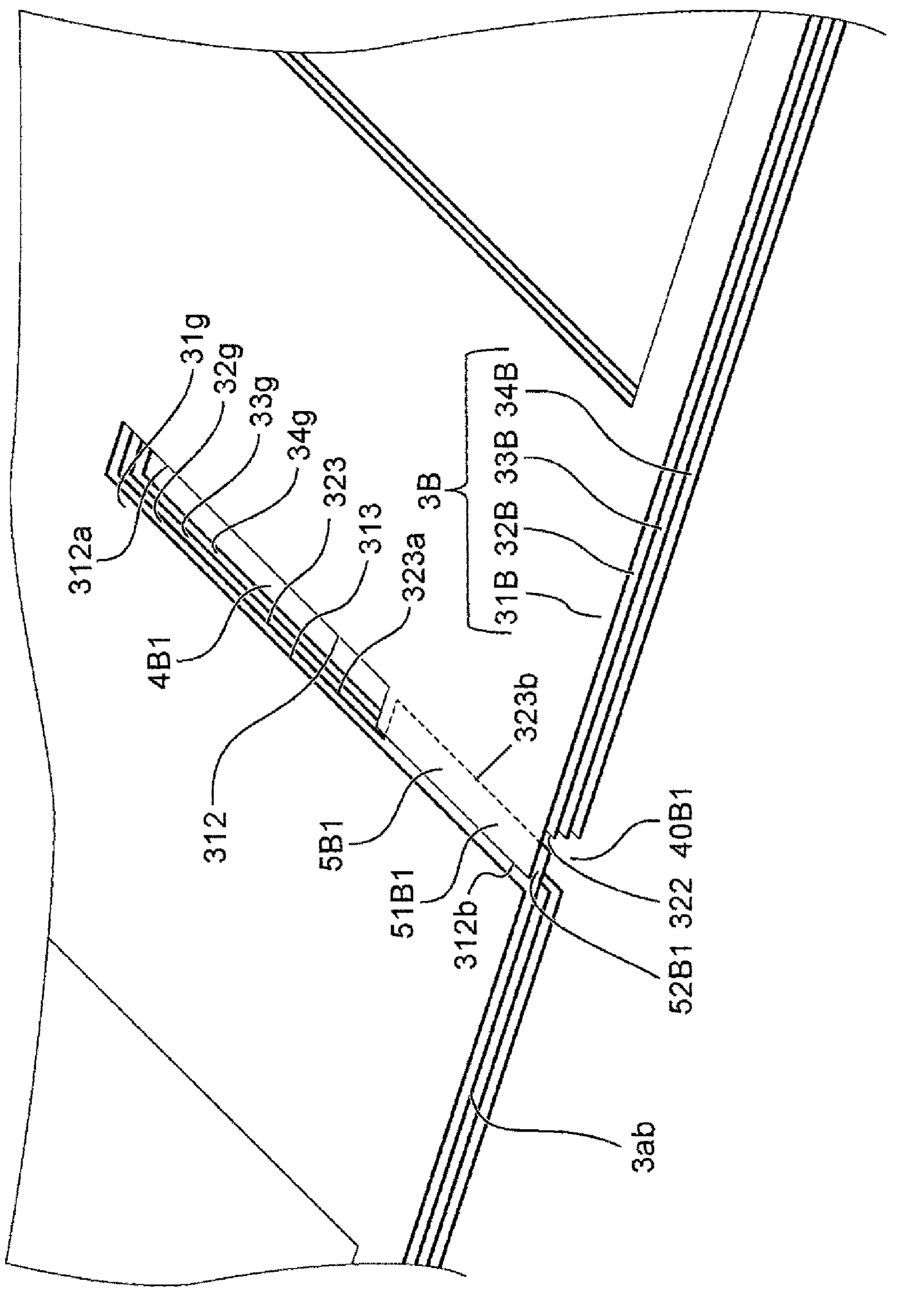
FIG. 19 is an enlarged perspective view of part of the antenna device in FIG. 18.
Figure 20:
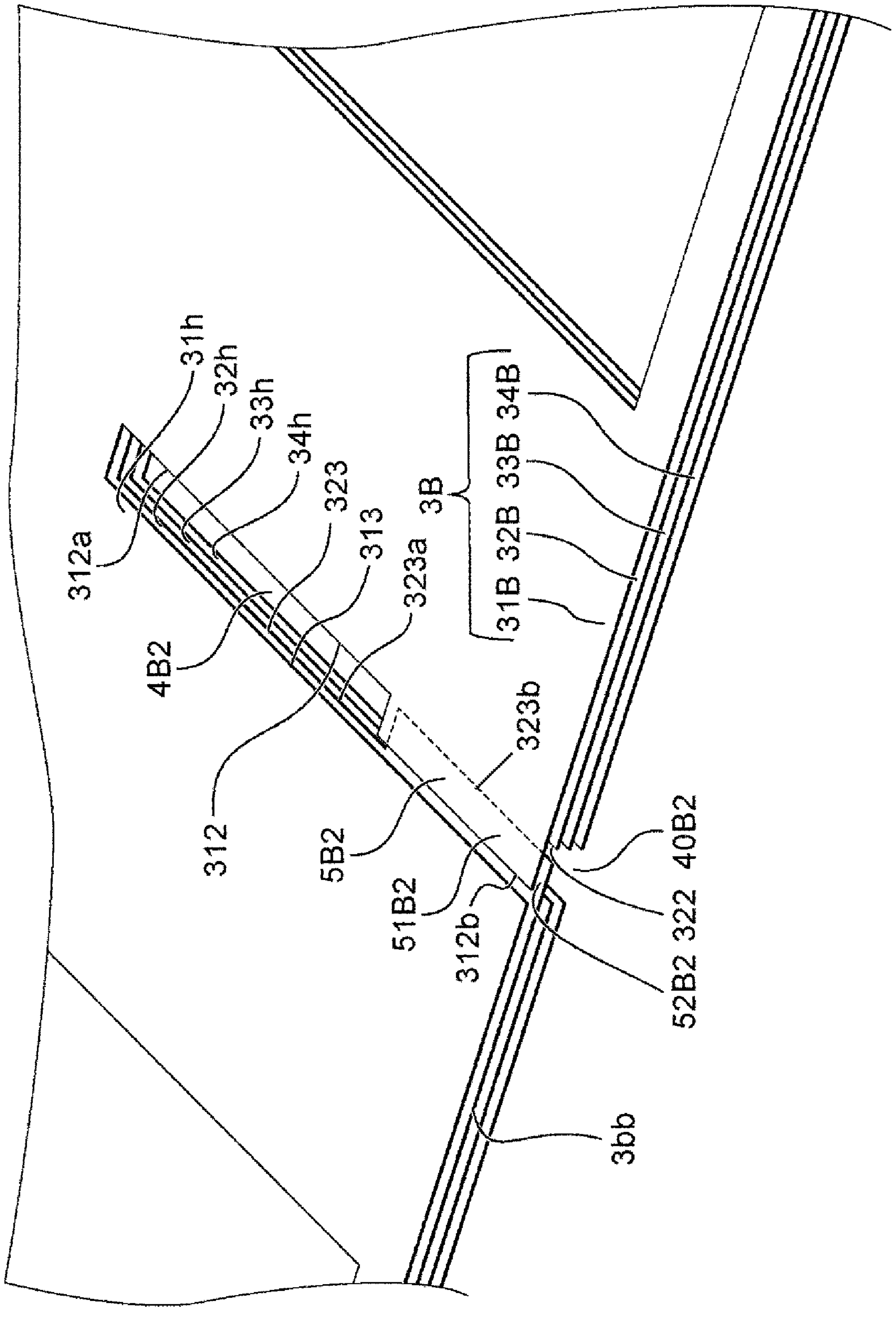
FIG. 20 is another enlarged perspective view of part of the antenna device in FIG. 18.

FIG. 19 is an enlarged perspective view of part of the antenna device 1B. More specifically, FIG. 19 is an enlarged perspective view of the slit structure 4B1 and its vicinities in the antenna device 1B. FIG. 20 is another enlarged perspective view of part of the antenna device 1B. More specifically, FIG. 20 is an enlarged perspective view of the slit structure 4B2 and its vicinities in the antenna device 1B.

As illustrated in FIGS. 19 and 20, the ground electrode 3B includes a plurality of ground layers 31B to 34B.

As illustrated in FIG. 19, the ground layers 31B to 34B have respective slits 31*g* to 34*g*. The set of slits 31*g* to 34*g* defines the slit structure 4B1 and the opposing structure 5B1. The slits 31*g* to 34*g* have shapes similar to those of the slits 31*a* to 34*a*. In the slit 31*g*, a first portion 312*a* is located side by side with a third portion 323*a* in the first direction and closer to the first antenna element 2*a* than the third portion 323*a*. A second portion 312*b* is located side by side with a fourth portion 323*b* in the first direction, closer to the second edge 313 than the first portion 312*a*, and closer to the second antenna element 2*b* than the fourth portion 323*b*. In the slit 32*g*, the third portion 323*a* is located side by side with the first portion 312*a* in the first direction and closer to the second antenna element 2*b* than the first portion 312*a*. The fourth portion 323*b* is located side by side with the second portion 312*b* in the first direction, closer to the third edge 322 than the third portion 323*a*, and closer to the first antenna element 2*a* than the second portion 312*b*. In the present embodiment, each of the slits 31*g* to 34*g* has a length adapted to a wavelength corresponding to the first frequency bandwidth.

The slit structure 4B1 extends from the first edge 3*ab* of the ground electrode 3B into the inside of the ground electrode 3B and has an open end 40B1. The slit structure 4B1 is located between the first antenna element 2*a* and the second antenna element 2*b* and has a first edge 41B1 on the first antenna element 2*a* side and a second edge 42B1 on the second antenna element 2*b* side. The edge 41B1 on the first antenna element 2*a* side is defined by the edge 322 on the first antenna element 2*a* side of the ground layer 32B. The edge 42B1 on the first antenna element 2*a* side is defined by the edge 313 on the second antenna element 2*b* side of the ground layer 31.

The ground layer 31B has a first protrusion 51B1. The first protrusion 51B1 extends from the edge 322 on the first antenna element 2*a* side of the ground layer 32B toward the second antenna element 2*b* in a plane orthogonal to the thickness direction of the ground electrode 3B. The ground layer 32B has a second protrusion 52B1. The second protrusion 52B1 extends from the edge 313 on the second antenna element 2*b* side of the ground layer 31B toward the first antenna element 2*a* in a plane orthogonal to the thickness direction of the ground electrode 3B. The first protrusion 51B1 of the ground layer 31B and the second protrusion 52B1 of the ground layer 32B overlap each other in the thickness direction of the ground electrode 3B with a specified distance therebetween. The first protrusion 51B1 and the second protrusion 52B1 form the opposing structure 5B1.

The opposing structure 5B1 is located in the slit structure 4B1 in a plane orthogonal to the thickness direction of the ground electrode 3B. In the present embodiment, the opposing structure 5B1 includes one set of the first protrusion 51B1 and the second protrusion 52B1. The first protrusion 51B1 and the second protrusion 52B1 are located at the open end 40B1 of the slit structure 4B1. The lengths of the first protrusion 51B1 and the second protrusion 52B1 are equal to each other. Each of the lengths of the first protrusion 51B1 and the second protrusion 52B1 is shorter than or equal to half the length of the slit structure 4B1. Hence, as viewed in the thickness direction of the ground electrode 3B, the area of the overlap between the first protrusion 51B1 and the second protrusion 52B1 in the opposing structure 5B1 is smaller than or equal to half the area of the slit structure 4B1.

As illustrated in FIG. 20, the ground layers 31B to 34B have respective slits 31*h* to 34*h*. The set of slits 31*h* to 34*h* defines the slit structure 4A2 and the opposing structure 5A2. The slits 31*g* to 34*g* have shapes similar to those of the slits 31*a* to 34*a*. In the slit 31*g*, a first portion 312*a* is located side by side with a third portion 323*a* in the first direction and closer to the first antenna element 2*a* than the third portion 323*a*. A second portion 312*b* is located side by side with a fourth portion 323*b* in the first direction, closer to the second edge 313 than the first portion 312*a*, and closer to the second antenna element 2*b* than the fourth portion 323*b*. In the slit 32*g*, the third portion 323*a* is located side by side with the first portion 312*a* in the first direction and closer to the second antenna element 2*b* than the first portion 312*a*. The fourth portion 323*b* is located side by side with the second portion 312*b* in the first direction, closer to the third edge 322 than the third portion 323*a*, and closer to the first antenna element 2*a* than the second portion 312*b*. In the present embodiment, each of the slits 31*g* to 34*g* has a length adapted to a wavelength corresponding to the first frequency bandwidth.

The slit structure 4B2 extends from the second edge 3*bb* of the ground electrode 3B into the inside of the ground electrode 3B and has an open end 40B2. The slit structure 4B2 is located between the first antenna element 2*a* and the second antenna element 2*b* and has a first edge 41B2 on the first antenna element 2*a* side and a second edge 42B2 on the second antenna element 2*b* side. The edge 41B2 on the first antenna element 2*a* side is defined by the edge 322 on the first antenna element 2*a* side of the ground layer 32B. The edge 42B2 on the first antenna element 2*a* side is defined by the edge 313 on the second antenna element 2*b* side of the ground layer 31.

The ground layer 31B has a first protrusion 51B2. The first protrusion 51B2 extends from the edge 322 on the first antenna element 2*a* side of the ground layer 32B toward the second antenna element 2*b* in a plane orthogonal to the thickness direction of the ground electrode 3B. The ground layer 32B has a second protrusion 52B2. The second protrusion 52B2 extends from the edge 313 on the second antenna element 2*b* side of the ground layer 31B toward the first antenna element 2*a* in a plane orthogonal to the thickness direction of the ground electrode 3B. The first protrusion 51B2 of the ground layer 31B and the second protrusion 52B2 of the ground layer 32B overlap each other in the thickness direction of the ground electrode 3B with a specified distance therebetween. The first protrusion 51B2 and the second protrusion 52B2 form the opposing structure 5B2.

The opposing structure 5B2 is located in the slit structure 4B2 in a plane orthogonal to the thickness direction of the ground electrode 3B. In the present embodiment, the opposing structure 5B2 includes one set of the first protrusion 51B2 and the second protrusion 52B2. The first protrusion 51B2 and the second protrusion 52B2 are located at the open end 40B2 of the slit structure 4B2. The lengths of the first protrusion 51B2 and the second protrusion 52B2 are equal to each other. Each of the lengths of the first protrusion 51B2 and the second protrusion 52B2 is shorter than or equal to half the length of the slit structure 4B2. Hence, as viewed in the thickness direction of the ground electrode 3B, the area of the overlap between the first protrusion 51B2 and the second protrusion 52B2 in the opposing structure 5B2 is smaller than or equal to half the area of the slit structure 4B2.

The slit structure 4B1 is provided to improve the isolation between the antenna elements 2*c* and 2*d*. The slit structure 4B2 is provided to improve the isolation between the antenna elements 2*c* and 2*e*. Each of the slit structures 4B1 and 4B2 has a length adapted to a wavelength corresponding to the first frequency bandwidth. As an example, the length of each of the slit structures 4B1 and 4B2 is determined based on the electrical length being one-fourth of a wavelength corresponding to the first frequency bandwidth.

The slit structures 4B1 and 4B2 include the respective opposing structures 5B1 and 5B2. In the antenna device 1B, the area where radio waves can pass through in the slit structures 4B1 and 4B2 can be smaller than in a configuration without the opposing structures 5B1 and 5B2 in the slit structures 4B1 and 4B2. In addition, since the opposing structures 5B1 and 5B2 function as capacitors having capacitances, the antenna device 1B can achieve the electrical length being one-fourth of the wavelength corresponding to the first frequency bandwidth even though the slit structures 4B1 and 4B2 are shorter than in a configuration without the opposing structures 5B1 and 5B2 in the slit structures 4B1 and 4B2. This configuration reduces the possibility of radio waves from the antenna elements 2*c* to 2*e* passing through the slit structures 4B1 and 4B2 and reaching the rear sides of the antenna elements 2*c* to 2*e*.

As described above, in the antenna device 1B of the present embodiment, the leakage of radio waves toward the rear sides of the antenna elements can be lower while the isolation between the antenna elements is improved.

1.4 Embodiment 4

Figure 21:
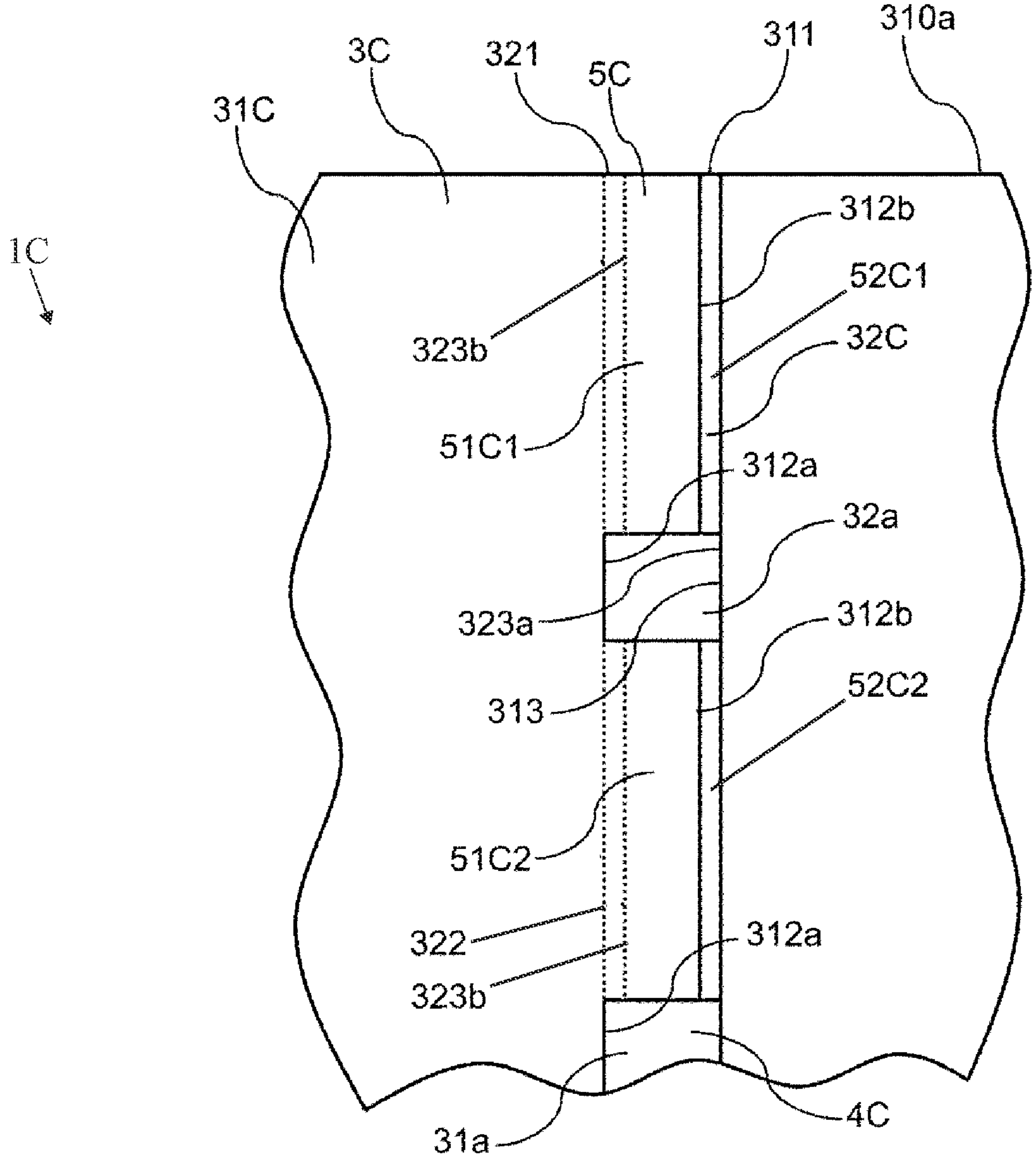
FIG. 21 is a plan view of part of a configuration example of an antenna device according to Embodiment 4.

FIG. 21 is a plan view of part of a configuration example of an antenna device 1C according to Embodiment 4. Although not illustrated in FIG. 21, the antenna device 1C includes first and second antenna elements 2*a* and 2*b* and a substrate 7, as with the antenna device 1. The substrate 7 includes a ground electrode 3C instead of the ground electrode 3. The ground electrode 3C has a plurality of ground layers as with the ground electrode 3 but differs from the ground electrode 3 in that the ground electrode 3C has a slit structure 4C and an opposing structure 5C instead of the slit structure 4 and the opposing structure 5.

The ground electrode 3C includes a plurality of ground layers including ground layers 31C and 32C. The plurality of ground layers include respective slits including slits 31*i* and 32*i* of the ground layers 31C and 32C. Each of the slits has a length adapted to a wavelength corresponding to the first frequency bandwidth.

The slit 31*i* of the ground layer 31C, as with the slit 31*a* of Embodiment 1, includes an open end 311, an edge 312 on the first antenna element 2*a* side (on the left side in FIG. 21), an edge 313 on the second antenna element 2*b* side (on the right side in FIG. 21), and a closed end 314. However, the slit 31*i*, unlike the slit 31*a* of Embodiment 1, has a plurality of first portions 312*al* and 312*a*2 and a plurality of second portions 312*b*1 and 312*b*2.

Hence, the ground layer 31C has a plurality of first protrusions 51C1 and 51C2 respectively corresponding to the plurality of second portions 312*b*1 and 312*b*2. The first protrusions 51C1 and 51C2 extend from an edge 322 on the first antenna element 2*a* side of the ground layer 32C toward the second antenna element 2*b* in a plane orthogonal to the thickness direction of the ground electrode 3C.

The slit 32*i* of the ground layer 32C, as with the slit 32*a* of Embodiment 1, includes an open end 32*i*, an edge 322 on the first antenna element 2*a* side (on the left side in FIG. 21), an edge 323 on the second antenna element 2*b* side (on the right side in FIG. 21), and a closed end 324. However, the slit 32*i*, unlike the slit 32*a* of Embodiment 1, has a plurality of third portions 323*al* and 323*a*2 and a plurality of fourth portions 323*b*1 and 323*b*2.

Hence, the ground layer 32C has a plurality of second protrusions 52C1 and 52C2 respectively corresponding to the plurality of fourth portions 323*b*1 and 323*b*2. The second protrusions 52C1 and 52C2 extend from the edge 313 on the second antenna element 2*b* side of the ground layer 31C toward the first antenna element 2*a* in a plane orthogonal to the thickness direction of the ground electrode 3C.

The first protrusion 51C1 and 51C2 of the ground layer 31C and the second protrusions 52C1 and 52C2 of the ground layer 32C overlap each other in the thickness direction of the ground electrode 3C with a specified distance therebetween. The first protrusion 51C1 and 51C2 and the second protrusions 52C1 and 52C2 form the opposing structure 5C. As described above, the opposing structure 5C includes two sets of the first protrusion and the second protrusion.

Each of the first protrusions 51C1 and 51C2 and the second protrusions 52C1 and 52C2 is rectangular. The set of the first protrusion 51C1 and the second protrusion 52C1 is located at the open end of the slit structure 4C. The set of the first protrusion 51C2 and the second protrusion 52C2 is located between the center and the open end of the slit structure 4C. In FIG. 21, the lengths of the first protrusion 51C1 and the second protrusion 52C1 are equal to each other, and the lengths of the first protrusion 51C2 and the second protrusion 52C2 are equal to each other. The total length of the first protrusions 51C1 and 51C2 is smaller than or equal to half the length of the slit structure 4C. Hence, the area of the overlap between the first and second protrusions is smaller than or equal to half the area of the slit structure 4C as viewed in the thickness direction of the ground electrode 3C. In the present embodiment, the area of the overlap between the first and second protrusions is the sum of the area of the overlap between the first protrusion 51C1 and the second protrusion 52C1 and the area of the overlap between the first protrusion 51C2 and the second protrusion 52C2. In general, in the case in which the opposing structure 5C includes a plurality of sets of first and second protrusions, the area of the overlap between the first and second protrusions refers to the sum of the areas of the overlaps between first and second protrusions included in the plurality of sets.

Also in the present embodiment, the slit structure 4C includes the opposing structure 5C. This configuration reduces the possibility of radio waves from the first and second antenna elements 2*a* and 2*b* passing through the slit structure 4C and reaching the rear sides of the first and second antenna elements 2*a* and 2*b*. As described above, in the antenna device 1C of the present embodiment, the leakage of radio waves toward the rear sides of the antenna elements can be lower while the isolation between the antenna elements is improved.

1.5 Embodiment 5

Figure 22:
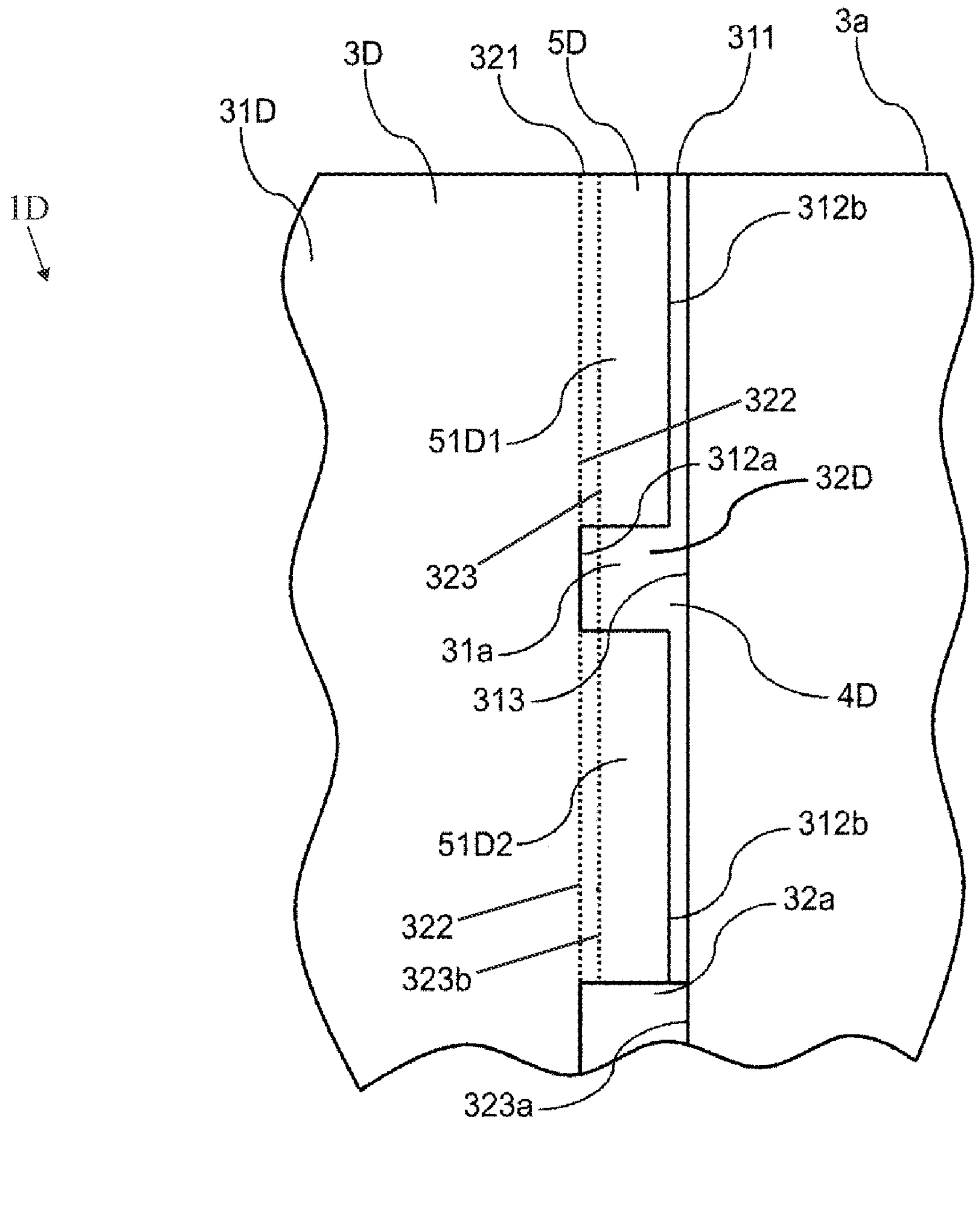
FIG. 22 is a plan view of part of a configuration example of an antenna device according to Embodiment 5.

FIG. 22 is a plan view of part of a configuration example of an antenna device 1D according to Embodiment 5. Although not illustrated in FIG. 22, the antenna device 1D has first and second antenna elements 2*a* and 2*b* and a substrate 7, as with the antenna device 1. The substrate 7 includes a ground electrode 3D instead of the ground electrode 3. The ground electrode 3D has a plurality of ground layers as with the ground electrode 3 but differs from the ground electrode 3 in that the ground electrode 3D has a slit structure 4D and an opposing structure 5D instead of the slit structure 4 and the opposing structure 5.

The ground electrode 3D includes a plurality of ground layers including ground layers 31D and 32D. The plurality of ground layers include respective slits including slits 31*j* and 32*j* of the ground layers 31D and 32D. Each of the slits has a length adapted to a wavelength corresponding to the first frequency bandwidth.

The slit 31*j* of the ground layer 31D, as with the slit 31*a* of Embodiment 1, includes an open end 311, an edge 312 on the first antenna element 2*a* side (on the left side in FIG. 22), an edge 313 on the second antenna element 2*b* side (on the right side in FIG. 22), and a closed end 314. However, the slit 31*j*, unlike the slit 31*a* of Embodiment 1, has a plurality of first portions 312*al* and 312*a*2 and a plurality of second portions 312*b*1 and 312*b*2.

Hence, the ground layer 31D has a plurality of first protrusions 51D1 and 51D2 respectively corresponding to the plurality of second portions 312*b*1 and 312*b*2. The first protrusions 51D1 and 51D2 extend from the edge 322 on the first antenna element 2*a* side of the ground layer 32D toward the second antenna element 2*b* in a plane orthogonal to the thickness direction of the ground electrode 3D.

The slit 32*j* of the ground layer 32D, as with the slit 32*a* of Embodiment 1, includes an open end 321, an edge 322 on the first antenna element 2*a* side (on the left side in FIG. 22), an edge 323 on the second antenna element 2*b* side (on the right side in FIG. 22), and a closed end 324. The slit 32*j*, as with the slit 32*a* of Embodiment 1, has one third portion 323*a* and one fourth portion 323*b*.

Hence, the ground layer 32D has one second protrusion 52D corresponding to one fourth portion 323*b*. The second protrusion 52D extends from the edge 313 on the second antenna element 2*b* side of the ground layer 31D toward the first antenna element 2*a* in a plane orthogonal to the thickness direction of the ground electrode 3D.

The first protrusions 51D1 and 51D2 of the ground layer 31D and the second protrusion 52D of the ground layer 32D overlap one another in the thickness direction of the ground electrode 3D with a specified distance therebetween. The first protrusions 51D1 and 51D2 and the second protrusion 52D form the opposing structure 5D. The opposing structure 5C includes two sets of the first and second protrusions. In the present embodiment, the two first protrusions 51D1 and 51D2 are combined with the one second protrusion 52D. The opposing structure 5D includes one set of the first and second protrusions.

Each of the first protrusions 51D1 and 51D2 and the second protrusion 52D is rectangular. The first protrusion 51D1 is located at the open end of the slit structure 4D. The first protrusion 51D2 is located between the center and the open end of the slit structure 4D. The second protrusion 52D is located at the open end of the slit structure 4D so as to overlap the first protrusions 51D1 and 51D2. The second protrusion 52D extends from the open end of the slit structure 4D to the end (the lower end in FIG. 22) of the first protrusion 51D2 opposite to the open end. In FIG. 22, the lengths of the first protrusions 51D1 and 51D2 are equal to each other. The total length of the first protrusions 51D1 and 51D2 is smaller than or equal to half the length of the slit structure 4D. Hence, the area of the overlap between the first and second protrusions is smaller than or equal to half the area of the slit structure 4D as viewed in the thickness direction of the ground electrode 3D. In the present embodiment, the area of the overlap between the first and second protrusions is the sum of the area of the overlap between the first protrusion 51D1 and the second protrusion 52D and the area of the overlap between the first protrusion 51D2 and the second protrusion 52D.

Also in the present embodiment, the slit structure 4D includes the opposing structure 5D. This configuration reduces the possibility of radio waves from the first and second antenna elements 2*a* and 2*b* passing through the slit structure 4D and reaching the rear sides of the first and second antenna elements 2*a* and 2*b*. As described above, in the antenna device 1D of the present embodiment, the leakage of radio waves toward the rear sides of the antenna elements can be lower while the isolation between the antenna elements is improved.

1.6 Embodiment 6

Figure 23:
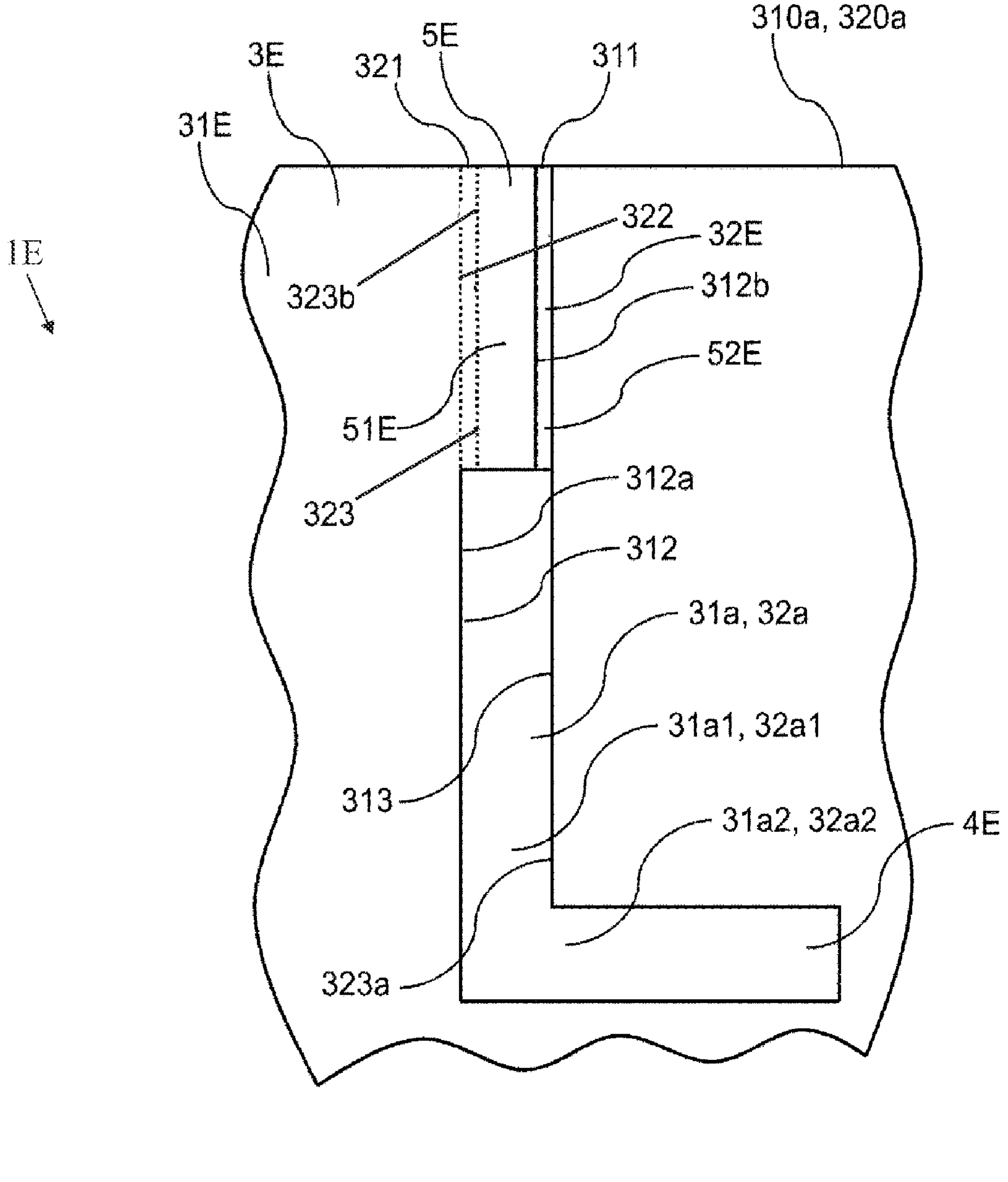
FIG. 23 is a plan view of part of a configuration example of an antenna device according to Embodiment 6.

FIG. 23 is a plan view of part of a configuration example of an antenna device 1E according to Embodiment 6. Although not illustrated in FIG. 23, the antenna device 1E includes first and second antenna elements 2*a* and 2*b* and a substrate 7, as with the antenna device 1. The substrate 7 includes a ground electrode 3E instead of the ground electrode 3. The ground electrode 3E has a plurality of ground layers as with the ground electrode 3 but differs from the ground electrode 3 in that the ground electrode 3E has a slit structure 4E and an opposing structure 5E instead of the slit structure 4 and the opposing structure 5.

The ground electrode 3E includes a plurality of ground layers including ground layers 31E and 32E. The plurality of ground layers include a plurality of slits including slits 31*k* and 32*k* of the ground layers 31E and 32E and defining the slit structure 4E and the opposing structure 5E.

The slit 31*k* of the ground layer 31E, unlike the slit 31*a* of Embodiment 1, is not linear. The slit 31*k* has an L shape. The slit 31*k* includes a first portion 31*kl* and a second portion 31*k*2. The first portion 31*kl* extends from a first edge 310*a* of the ground layer 31E into the inside of the ground layer 31E. The second portion 31*k*2 extends from the distal end (closed end) of the first portion 31*kl* in a direction intersecting the longitudinal direction of the first portion 31*k*1. In the present embodiment, the longitudinal direction of the second portion 31*k*2 and the longitudinal direction of the first portion 31*kl* are orthogonal to each other. The first portion 31*kl* of the slit 31*k* includes an open end 311, an edge 312 on the first antenna element 2*a* side (on the left side in FIG. 23), and an edge 313 on the second antenna element 2*b* side (on the right side in FIG. 23). The slit 31*k* has a first portion 312*a* and a second portion 312*b* in the first portion 31*k*1.

The slit 32*k* of the ground layer 32E, unlike the slit 32*a* of Embodiment 1, is not linear. The slit 32*k* has an L shape similar to that of the slit 31*k*. The slit 32*k* includes a first portion 32*kl* and a second portion 32*k*2. The first portion 32*kl* extends from a first edge 320*a* of the ground layer 32E into the inside of the ground layer 32E. The second portion 32*k*2 extends from the distal end (closed end) of the first portion 32*k*1 in a direction intersecting the longitudinal direction of the first portion 32*kl*. In the present embodiment, the longitudinal direction of the second portion 32*k*2 and the longitudinal direction of the first portion 32*kl* are orthogonal to each other. The first portion 32*k*1 of the slit 32*k* includes an open end 321, an edge 322 on the first antenna element 2*a* side (on the left side in FIG. 23), and an edge 323 on the second antenna element 2*b* side (on the right side in FIG. 23). The slit 32*k* has a third portion 323*a* and a fourth portion 323*b* in the first portion 32*k*1.

The slits 31*k* and 32*k*, as with the slits 31*a* and 32*a* of Embodiment 1, have a length adapted to a wavelength corresponding to the first frequency bandwidth. However, since the slits 31*k* and 32*k* have the second portions 31*k*2 and 32*k*2, the first portions 31*kl* and 32*kl* are shorter than the slits 31*a* and 32*a*. Specifically, even in the case in which an antenna device does not have an enough space to make slits in the width direction of the ground electrode because of design restriction, there may be cases in which the slits 31*k* and 32*k* can be formed instead of the slits 31*a* and 32*a*. Since the slit structure 4E is not linear and is an L-shaped, the slit structure 4E is more difficult for radio waves from the first and second antenna elements 2*a* and 2*b* to pass through.

The opposing structure 5E is located in the slit structure 4E. The opposing structure 5E includes a first protrusion 51E and a second protrusion 52E. The opposing structure 5E includes one set of the first and second protrusions.

The first protrusion 51E extends from a first edge 41E on the first antenna element 2*a* side of a first portion 4Ea of the slit structure 4E toward the second antenna element 2*b*. The first protrusion 51E is not in contact with a second edge 42E on the second antenna element 2*b* side of the first portion 4Ea of the slit structure 4E. The second protrusion 52E extends from the second edge 42E of the slit structure 4E toward the first antenna element 2*a*. The second protrusion 52E is not in contact with the first edge 41E of the slit structure 4E. As illustrated in FIG. 23, the second protrusion 52E overlaps the first protrusion 51E. More specifically, the first protrusion 51E and the second protrusion 52E overlap each other in the thickness direction of the ground electrode 3E.

Each of the first protrusion 51E and the second protrusion 52E is rectangular. The first protrusion 51E and the second protrusion 52E are located at an open end 40E of the slit structure 4E. In FIG. 23, the lengths of the first protrusion 51E and the second protrusion 52E are equal to each other. Each of the lengths of the first protrusion 51E and the second protrusion 52E is shorter than or equal to half the length of the slit structure 4E. The area of the overlap between the first protrusion 51E and the second protrusion 52E is smaller than or equal to half the area of the slit structure 4E as viewed in the thickness direction of the ground electrode 3E.

Also in the present embodiment, the slit structure 4E includes the opposing structure 5E. This configuration reduces the possibility of radio waves from the first and second antenna elements 2*a* and 2*b* passing through the slit structure 4E and reaching the rear sides of the first and second antenna elements 2*a* and 2*b*. As described above, in the antenna device 1E of the present embodiment, the leakage of radio waves toward the rear sides of the antenna elements can be lower while the isolation between the antenna elements is improved.

2. Modification Example

Embodiments of the present disclosure are not limited to those described above. The embodiments described above may be modified in various ways depending on designs and other factors as long as a possible benefit of the present disclosure can be achieved. The following shows a list of modification examples of the embodiments described above. The modification examples described below may be combined as appropriate when applied.

In a modification example, the first and second antenna elements are not limited to planar antennas. The first and second antenna elements may be planar inverted-F antennas. The first and second antenna elements may be any antennas that can be mounted on a substrate.

In a modification example, each of the first and second antenna elements may not support the first frequency bandwidth and the second frequency bandwidth higher than the first frequency bandwidth. A configuration in which at least one of the first and second antenna elements is adapted to a single frequency bandwidth is possible. Alternatively, at least one of the first and second antenna elements may be adapted to three or more frequency bandwidths. The frequency bandwidths of antenna elements are not limited to the frequency bandwidths for radio communication in UWB. The frequency bandwidths of antenna elements may be, for example, those for radio communication through Wi-Fi. The frequency bandwidths for radio communication through Wi-Fi include a frequency bandwidth around 2.4 GHZ (for example, 2.4 GHz to 2.5 GHZ) and a frequency bandwidth around 5 GHz (for example, 5.15 GHz to 5.8 GHZ). The frequency bandwidths of antenna elements may be selected from, for example, publicly-known frequency bandwidths such as a mid-band of a 2G (the second generation mobile communication) standard, a low band of a 4G (the fourth generation mobile communication) standard, and a low band of a 5G (the fifth generation mobile communication) standard. Examples of 2G standards include the GSM (registered trademark) standard (GSM: Global System for Mobile Communications). Examples of 4G standards include the 3GPP LTE standard (LTE: Long Term Evolution). Examples of 5G standards include 5G NR (New Radio). The frequency bandwidths of antenna elements may be selected from frequency bandwidths used in various communication standards such as Bluetooth (registered trademark), wireless LAN, specified low-power radio, and near-field communication.

In a modification example, an antenna device may include three or more antenna elements. The ground electrode may have a slit between any two antenna elements among the three or more antenna elements.

In a modification example, the configuration of the substrate is not limited to those of the embodiments. For example, the shape of the substrate is not limited to a rectangular plate shape. The substrate may be a double-sided copper-clad laminate or the like instead of a multilayer substrate. In this case, the ground electrode may be composed of ground layers on both sides of the substrate.

In a modification example, the configuration of the ground electrode is not limited to those of the embodiments. For example, the shape of the ground electrode is not limited to a rectangular one. The ground electrode needs only to have areas for first and second antenna elements and an area with such a size that a slit can be formed from a specified edge. The ground electrode need not include four ground layers. The number of ground layers may be two, three, or five or more.

In a modification example, a slit needs only to include a portion extending from a specified edge of the ground electrode in a second direction intersecting the first direction parallel to a line connecting first antenna element 2*a* and the second antenna element 2*b*. In other words, a slit may curve at an intermediate position after extending in the second direction. The slit is not limited to being linear and may have an L shape like the one in Embodiment 6 or another shape such as a T shape and a meander shape. The slit may have an electrical length adapted to a wavelength corresponding to the frequency bandwidth in which the isolation needs to be improved. Since the slit is formed in the ground electrode, the shape of the slit should preferably be symmetrical with respect to the line passing through the midpoint between the first antenna element and the second antenna element so that the ground electrode appears the same with respect to the first and second antenna elements.

In a modification example of Embodiment 1, the slit structure 4 (the slits 31*a* to 34*a*) may have a length adapted to a wavelength corresponding to the second frequency bandwidth. In terms of this point, the same is true of Embodiment 3 to 6.

In a modification example of Embodiment 1, in the slits 31*a* to 34*a* included in the slit structure 4, the open ends 311 to 341 may not overlap one another in the thickness direction of the ground electrode 3, and the closed ends 314 to 344 may not overlap one another in the thickness direction of the ground electrode 3. The first portion 312*a* of the edge 312 on the first antenna element 2*a* side of the slit 31*a* may not overlap the edge 322 on the first antenna element 2*a* side of the slit 32*a* in the thickness direction of the ground electrode 3. The third portion 323*a* of the edge 323 on the second antenna element 2*b* side of the slit 32*a* may not overlap the edge 313 on the second antenna element 2*b* side of the slit 31*a* in the thickness direction of the ground electrode 3. The edge 332 on the first antenna element 2*a* side of the slit 33*a* may not overlap the first portion 312*a* of the edge 312 on the first antenna element 2*a* side of the slit 31*a* and the edge 322 on the first antenna element 2*a* side of the slit 32*a* in the thickness direction of the ground electrode 3. The edge 333 on the second antenna element 2*b* side of the slit 33*a* may not overlap the third portion 323*a* of the edge 323 on the second antenna element 2*b* side of the slit 32*a* and the edge 313 on the second antenna element 2*b* side of the slit 31*a* in the thickness direction of the ground electrode 3. The edge 342 on the first antenna element 2*a* side of the slit 34*a* may not overlap the first portion 312*a* of the edge 312 on the first antenna element 2*a* side of the slit 31*a* and the edge 322 on the first antenna element 2*a* side of the slit 32 in the thickness direction of the ground electrode 3. The edge 343 on the second antenna element 2*b* side of the slit 34*a* may not overlap the third portion 323*a* of the edge 323 on the second antenna element 2*b* side of the slit 32 and the edge 313 on the second antenna element 2*b* side of the slit 31*a* in the thickness direction of the ground electrode 3. In these cases, the portion substantially effective in the slit structure 4 is the portion extending through the ground layers 31 to 34 in the thickness direction. Hence, the slit structure 4 makes the configuration of Embodiment 1 small.

In a modification example of Embodiment 2, the first and second slit structures 4A1 and 4A2 may be located together in the first edge 3*aa* or in the third edge 3*ac* of the ground electrode 3A, instead of in different sides.

In a modification example of Embodiment 3, the slit structure 4B1 may be located in the fifth edge 3*eb*, instead of in the first edge 3*ab*. The slit structure 4B2 may be located in the fourth edge 3*db*, instead of in the second edge 3*bb*.

In a modification example, the length of a slit should preferably be one-tenth or more and one-fourth or less of a wavelength corresponding to the frequency bandwidth in which the isolation between the first and second antenna elements needs to be improved. The width of the slit should preferably be one-hundredth or more of a wavelength corresponding to the frequency bandwidth in which the isolation between the first and second antenna elements needs to be improved.

In a modification example, the first protrusion and the second protrusion in the opposing structure may not be located at the open end of the slit. The first protrusion and the second protrusion may be located between the center and the open end of the slit. The first protrusion and the second protrusion may be located between the center and the closed end of the slit. The effect of the isolation improvement can be higher in the case in which the first protrusion and the second protrusion are at the open end of the slit.

In a modification example, the first protrusion and the second protrusion in the opposing structure may not be included in ground layers next to each other. For example, in Embodiment 1, the second protrusion 52 may be included in the ground layer 34, instead of in the ground layer 32. However, the closer the first and second protrusions are, the higher capacitance the opposing structure has.

In a modification example, an opposing structure may have three or more sets of first and second protrusions. Specifically, the ground layers may have three or more sets of a second portion of a first slit and a fourth portion of a second slit. The effect of the isolation improvement can be higher in the case in which an opposing structure has one set of first and second protrusions.

3. Configurations

As clearly seen from the embodiments and the modification examples described above, the present disclosure includes the following configurations. The following description includes symbols in parentheses only to clarify the correspondence relationship with the embodiments. However, to make the sentences easier to read, parenthesized symbols may be omitted from the second occurrence onward.

A first configuration is an antenna device (1; 1A; 1B; 1C; 1D; 1E) including: a first antenna element (2*a*); a second antenna element (2*b*); and a ground electrode (3; 3A; 3B; 3C; 3D; 3E) located on rear sides of the first antenna element (2*a*) and the second antenna element (2*b*) and coupled to the first antenna element (2*a*) and the second antenna element (2*b*). The ground electrode (3 to 3E) includes first and second ground layers (31, 32; 31A, 32A; 31B, 32B) aligned in a thickness direction of the ground electrode (3 to 3E). The first ground layer (31; 31A; 31B) has a first slit (31*a*; 31*e*; 31*f*; 31*g*; 31*h*; 311; 31*j*; 31*k*) extending from an edge (310*a*) of the first ground layer (31 to 31B) corresponding to a specified edge (3*a*; 3*aa*, 3*ca*; 3*ab*, 3*bb*) of the ground electrode (3 to 3E) in a second direction intersecting a first direction parallel to a line connecting the first antenna element (2*a*) and the second antenna element (2*b*), and including a first edge (312) on a side of the first antenna element (2*a*) and a second edge (313) on a side of the second antenna element (2*b*). The second ground layer (32; 32A; 32B) has a second slit (32*a*; 32*e*; 32*f*; 32*g*; 32*h*; 32*i*; 32*j*; 32*k*) extending from an edge (320*a*) of the second ground layer (32; 32A; 32B) corresponding to the specified edge of the ground electrode (3 to 3E) in the second direction, aligned with the first slit (31*a*; 31*e* to 31*k*) in the thickness direction of the ground electrode (3 to 3E), and including a third edge (322) on the side of the first antenna element (2*a*) and a fourth edge (323) on the side of the second antenna element (2*b*). The first edge (312) of the first slit (31*a*; 31*e* to 31*k*) includes a first portion (312*a*) and a second portion (312*b*) closer to the second edge (313) than the first portion (312*a*). The fourth edge (323) of the second slit (32*a*; 32*e* to 32*k*) includes a third portion (323*a*) located side by side with the first portion (312*a*) in the first direction and closer to the second antenna element (2*b*) than the first portion (312*a*) and a fourth portion (323*b*) located side by side with the second portion (323*b*) in the first direction, closer to the third edge (322) than the third portion (323*a*), and closer to the first antenna element (2*a*) than the second portion (312*b*). This configuration enables a reduction in the leakage of radio waves toward the rear sides of the antenna elements (first and second antenna elements 2*a*, 2*b*) while improving the isolation between the antenna elements (first and second antenna elements 2*a*, 2*b*).

A second configuration is an antenna device (1 to 1E) based on the first configuration. In the second configuration, the first portion (312*a*) of the first edge (312) of the first slit (31*a*; 31*e* to 31*k*) overlaps the third edge (322) of the second slit (32*a*; 32*e* to 32*k*) in the thickness direction of the ground electrode (3 to 3E). The third portion (323*a*) of the fourth edge (323) of the second slit (32*a*; 32*e* to 32*k*) overlaps the second edge (313) of the first slit (31*a*; 31*e* to 31*k*) in the thickness direction of the ground electrode (3 to 3E). This configuration makes the first slit and the second slit smaller.

A third configuration is an antenna device (1 to 1E) based on the first or second configuration. In the third configuration, the ground electrode (3 to 3E) includes a third ground layer (33, 34; 33A, 34A; 33B, 34B) aligned with the first and second ground layers (31, 32; 31A, 32A; 31B, 32B) in the thickness direction of the ground electrode (3 to 3E). The third ground layer has a third slit (33*a*, 34*a*; 33*e* to 33*f*, 34*e* to 34*f*; 33*g* to 33*h*, 34*g* to 34*f*) extending from an edge of the third ground layer corresponding to the specified edge of the ground electrode in the second direction and aligned with the first and second slits in the thickness direction of the ground electrode. This configuration, including a larger number of ground layers, enables a reduction in the leakage of radio waves toward the rear sides of the antenna elements (first and second antenna elements 2*a*, 2*b*) while improving the isolation between the antenna elements (first and second antenna elements 2*a*, 2*b*).

A fourth configuration is an antenna device (1 to 1E) based on the third configuration. In the fourth configuration, the third slit (33*a*, 34*a*; 33*e* to 33*f*, 34*e* to 34*f*; 33*g* to 33*h*, 34*g* to 34*f*) includes a fifth edge (332, 342) on the side of the first antenna element (2*a*) and a sixth edge (333, 343) on the side of the second antenna element (2*b*). The fifth edge of the third slit overlaps the first portion of the first edge of the first slit and the third edge of the second slit in the thickness direction of the ground electrode. The sixth edge of the third slit overlaps the third portion of the fourth edge of the second slit and the second edge of the first slit in the thickness direction of the ground electrode. This configuration makes the third slit smaller.

A fifth configuration is an antenna device (1 to 1E) based on the third or fourth configuration. In the fifth configuration, the first ground layer (31; 31A; 31B) and the second ground layer (32; 32A; 32B) are next to each other. This configuration enables a further reduction in the leakage of radio waves toward the rear sides of the antenna elements (first and second antenna elements 2*a*, 2*b*).

A sixth configuration is an antenna device (1 to 1E) based on the fifth configuration. In the sixth configuration, the first ground layer (31; 31A; 31B) is the closest to the first antenna element (2*a*) and the second antenna element (2*b*) among the first to third ground layers (31 to 34; 31A to 34A; 31B to 34B). Following the first ground layer (31; 31A; 31B), the second ground layer (32; 32A; 32B) is the next closest layer to the first antenna element (2*a*) and the second antenna element (2*b*) among the first to third ground layers (31 to 34; 31A to 34A; 31B to 34B). This configuration enables a further reduction in the leakage of radio waves toward the rear sides of the antenna elements (first and second antenna elements 2*a*, 2*b*).

A seventh configuration is an antenna device (1 to 1E) based on any one of the first to sixth configurations. In the seventh configuration, the second portion (312*b*) is closer to an open end (311) of the first slit (31*a*; 31*e* to 31*k*) than the first portion (312*a*). The fourth portion (323*b*) is closer to an open end (321) of the second slit (32*a*; 32*e* to 32*k*) than the third portion (323*a*). This configuration enables a further reduction in the leakage of radio waves toward the rear sides of the antenna elements (first and second antenna elements 2*a*, 2*b*).

An eighth configuration is an antenna device (1 to 1E) based on the seventh configuration. In the eighth configuration, the second portion (312*b*) is closer to the open end (311) of the first slit (31*a*; 31*e* to 31*k*) than the center of the first slit (31*a*; 31*e* to 31*k*). The fourth portion (323*b*) is closer to the open end (321) of the second slit (32*a*; 32*e* to 32*k*) than the center of the second slit (32*a*; 32*e* to 32*k*). This configuration enables a further reduction in the leakage of radio waves toward the rear sides of the antenna elements (first and second antenna elements 2*a*, 2*b*).

A ninth configuration is an antenna device (1 to 1E) based on the seventh or eighth configuration. In the ninth configuration, the second portion (312*b*) is located at the open end (311) of the first slit (31*a*; 31*e* to 31*k*). The fourth portion (323*b*) is located at the open end (321) of the second slit (32*a*; 32*e* to 32*k*). This configuration enables a further reduction in the leakage of radio waves toward the rear sides of the antenna elements (first and second antenna elements 2*a*, 2*b*).

A tenth configuration is an antenna device (1; 1A; 1B; 1E) based on any one of the first to ninth configurations. In the tenth configuration, a set of the first slit (31*a*; 31*e*, 31*f*; 31*k*) and the second slit (32*a*; 32*e*, 32*f*; 32*k*) includes one set of the second portion (312*b*) and the fourth portion (323*b*). This configuration enables a further reduction in the leakage of radio waves toward the rear sides of the antenna elements (first and second antenna elements 2*a*, 2*b*).

An eleventh configuration is an antenna device (1 to 1E) based on any one of the first to tenth configurations. In the eleventh configuration, as viewed in the thickness direction of the ground electrode (3 to 3E), the area of the portion between the second portion (312*b*) of the first edge (312) of the first slit (31*a*; 31*e* to 31*h*; 31*k*) and the fourth portion (323*b*) of the fourth edge (323) of the second slit (32*a*; 32*e* to 32*h*; 31*k*) in the ground electrode (3 to 3E) is smaller than or equal to half the area of the portion between the second edge (313) of the first slit (31*a*; 31*e* to 31*h*) and the third edge (322) of the second slit (32*a*; 32*e* to 32*h*) in the ground electrode (3 to 3E). This configuration enables a further reduction in the leakage of radio waves toward the rear sides of the antenna elements (first and second antenna elements 2*a*, 2*b*).

A twelfth configuration is an antenna device (1; 1B to 1E) based on any one of the first to eleventh configurations. In the twelfth configuration, each of the first antenna element (2*a*) and the second antenna element (2*b*) supports a first frequency bandwidth and a second frequency bandwidth higher than the first frequency bandwidth. Each of the first slit (31*a*; 31*g* to 31*k*) and the second slit (32*a*; 32*g* to 32*k*) has a length adapted to a wavelength corresponding to the first frequency bandwidth. This configuration enables a reduction in the leakage of radio waves toward the rear sides of the antenna elements (first and second antenna elements 2*a*, 2*b*) in the second frequency bandwidth while improving the isolation between the antenna elements (first and second antenna elements 2*a*, 2*b*) in the first frequency bandwidth.

A thirteenth configuration is an antenna device (1A) based on any one of the first to eleventh configurations. In the thirteenth configuration, each of the first antenna element (2*a*) and the second antenna element (2*b*) supports a first frequency bandwidth and a second frequency bandwidth higher than the first frequency bandwidth. The ground electrode (3A) has a first set of the first and second slits (31*e*, 32*e*) and a second set of the first and second slits (31*f*, 32*f*). Each of the first and second slits (31*e*, 32*e*) included in the first set has a length adapted to a wavelength corresponding to the first frequency bandwidth. Each of the first and second slits (31*f*, 32*f*) included in the second set has a length adapted to a wavelength corresponding to the second frequency bandwidth. This configuration enables a reduction in the leakage of radio waves toward the rear sides of the antenna elements (first and second antenna elements 2*a*, 2*b*) while improving the isolation between the antenna elements (first and second antenna elements 2*a*, 2*b*) in the first frequency bandwidth and the second frequency bandwidth.

A fourteenth configuration is an antenna device (1 to 1E) based on any one of the first to thirteenth configurations. In the fourteenth configuration, each of the first antenna element (2*a*) and the second antenna element (2*b*) is a planar antenna. This configuration enables downsizing of the antenna device (1 to 1E).

The present disclosure is applicable to antenna devices. Specifically, the present disclosure is applicable to an antenna device including a plurality of antenna elements.

1 to 1E ANTENNA DEVICE
2*a* FIRST ANTENNA ELEMENT
2*b* SECOND ANTENNA ELEMENT
3 to 3E GROUND ELECTRODE
3*a* FIRST EDGE (SPECIFIED EDGE)
3*aa* FIRST EDGE (SPECIFIED EDGE)
3*ca* THIRD EDGE (SPECIFIED EDGE)
3*ab* FIRST EDGE (SPECIFIED EDGE)
3*bb* SECOND EDGE (SPECIFIED EDGE)
31, 31A, 31B GROUND LAYER (FIRST GROUND LAYER)
32, 32A, 32B GROUND LAYER (SECOND GROUND LAYER)
33, 33A, 33B GROUND LAYER (THIRD GROUND LAYER)
34, 34A, 34B GROUND LAYER (FOURTH GROUND LAYER)
31*a* SLIT (FIRST SLIT)
312 EDGE (FIRST EDGE)
312*a* PORTION (FIRST PORTION)
312*b* PORTION (SECOND PORTION)
313 EDGE (SECOND EDGE)
32*a* SLIT (SECOND SLIT)
322 EDGE (THIRD EDGE)
323 EDGE (FOURTH EDGE)
323*a* PORTION (THIRD PORTION)
323*b* PORTION (FOURTH PORTION)
33*a* SLIT (THIRD SLIT)
332 EDGE (FIFTH EDGE)
333 EDGE (SIXTH EDGE)
34*a* SLIT (FOURTH SLIT)
342 EDGE (FIFTH EDGE)
343 EDGE (SIXTH EDGE)

The invention claimed is:

1. An antenna device comprising:

a first antenna element;

a second antenna element; and a ground electrode located on rear sides of the first antenna element and the second antenna element and coupled to the first antenna element and the second antenna element, wherein the ground electrode includes first and second ground layers aligned in a thickness direction of the ground electrode, the first ground layer has a first slit located between the first antenna element and the second antenna element as viewed in the thickness direction of the ground electrode, extending from an edge of the first ground layer corresponding to a specified edge of the ground electrode in a second direction intersecting a first direction parallel to a line connecting the first antenna element and the second antenna element, and including a first edge on a side of the first antenna element and a second edge on a side of the second antenna element, the second ground layer has a second slit extending from an edge of the second ground layer corresponding to the specified edge of the ground electrode in the second direction, aligned with the first slit in the thickness direction of the ground electrode, and including a third edge on the side of the first antenna element and a fourth edge on the side of the second antenna element, the first edge of the first slit includes a first portion and a second portion closer to the second edge than the first portion, and the fourth edge of the second slit includes a third portion located side by side with the first portion in the first direction and closer to the second antenna element than the first portion and a fourth portion located side by side with the second portion in the first direction, closer to the third edge than the third portion, and closer to the first antenna element than the second portion.

2. The antenna device according to claim 1, wherein the first portion of the first edge of the first slit overlaps the third edge of the second slit in the thickness direction of the ground electrode, and the third portion of the fourth edge of the second slit overlaps the second edge of the first slit in the thickness direction of the ground electrode.

3. The antenna device according to claim 1, wherein the ground electrode further includes a third ground layer aligned with the first and second ground layers in the thickness direction of the ground electrode, and the third ground layer has a third slit extending from an edge of the third ground layer corresponding to the specified edge of the ground electrode in the second direction and aligned with the first and second slits in the thickness direction of the ground electrode.

4. The antenna device according to claim 3, wherein the third slit includes a fifth edge on the side of the first antenna element and a sixth edge on the side of the second antenna element, the fifth edge of the third slit overlaps the first portion of the first edge of the first slit and the third edge of the second slit in the thickness direction of the ground electrode, and the sixth edge of the third slit overlaps the third portion of the fourth edge of the second slit and the second edge of the first slit in the thickness direction of the ground electrode.

5. The antenna device according to claim 3, wherein the first and second ground layers are next to each other.

6. The antenna device according to claim 5, wherein the first ground layer is the closest to the first antenna element and the second antenna element among the first to third ground layers, and following the first ground layer, the second ground layer is a next closest layer to the first antenna element and the second antenna element among the first to third ground layers.

7. The antenna device according to claim 1, wherein the second portion is closer to an open end of the first slit than the first portion, and the fourth portion is closer to an open end of the second slit than the third portion.

8. The antenna device according to claim 7, wherein the second portion is closer to the open end of the first slit than a center of the first slit, and the fourth portion is closer to the open end of the second slit than a center of the second slit.

9. The antenna device according to claim 7, wherein the second portion is located at the open end of the first slit, and the fourth portion is located at the open end of the second slit.

10. The antenna device according to claim 1, wherein a set of the first and second slits includes one set of the second portion and the fourth portion.

11. The antenna device according to claim 1, wherein as viewed in the thickness direction of the ground electrode, an area of a portion between the second portion of the first edge of the first slit and the fourth portion of the fourth edge of the second slit in the ground electrode is smaller than or equal to half an area of a portion between the second edge of the first slit and the third edge of the second slit in the ground electrode.

12. The antenna device according to claim 1, wherein each of the first antenna element and the second antenna element supports a first frequency bandwidth and a second frequency bandwidth higher than the first frequency bandwidth, and each of the first and second slits has a length adapted to a wavelength corresponding to the first frequency bandwidth.

13. The antenna device according to claim 1, wherein each of the first antenna element and the second antenna element supports a first frequency bandwidth and a second frequency bandwidth higher than the first frequency bandwidth, the ground electrode has a first set of the first and second slits and a second set of the first and second slits, each of the first and second slits included in the first set has a length adapted to a wavelength corresponding to the first frequency bandwidth, and each of the first and second slits included in the second set has a length adapted to a wavelength corresponding to the second frequency bandwidth.

14. The antenna device according to claim 1, wherein each of the first antenna element and the second antenna element is a planar antenna.

15. The antenna device according to claim 2, wherein the ground electrode further includes a third ground layer aligned with the first and second ground layers in the thickness direction of the ground electrode, and the third ground layer has a third slit extending from an edge of the third ground layer corresponding to the specified edge of the ground electrode in the second direction and aligned with the first and second slits in the thickness direction of the ground electrode.

16. The antenna device according to claim 4, wherein the first and second ground layers are next to each other.

17. The antenna device according to claim 2, wherein the second portion is closer to an open end of the first slit than the first portion, and the fourth portion is closer to an open end of the second slit than the third portion.

18. The antenna device according to claim 3, wherein the second portion is closer to an open end of the first slit than the first portion, and the fourth portion is closer to an open end of the second slit than the third portion.

19. The antenna device according to claim 4, wherein the second portion is closer to an open end of the first slit than the first portion, and the fourth portion is closer to an open end of the second slit than the third portion.

20. The antenna device according to claim 5, wherein the second portion is closer to an open end of the first slit than the first portion, and the fourth portion is closer to an open end of the second slit than the third portion.

* * * * *